US007696655B2

(12) United States Patent
Shishido et al.

(10) Patent No.: US 7,696,655 B2
(45) Date of Patent: Apr. 13, 2010

(54) AUTOMATIC BALANCING APPARATUS, ROTATING APPARATUS, DISC DRIVE APPARATUS, AND BALANCER

(75) Inventors: Yuji Shishido, Kanagawa (JP); Takashi Mochida, Chiba (JP); Rikuhiro Hanai, Tokyo (JP)

(73) Assignee: Sony Corporation, Tokyo (JP)

( * ) Notice: Subject to any disclaimer, the term of this patent is extended or adjusted under 35 U.S.C. 154(b) by 688 days.

(21) Appl. No.: 11/601,774

(22) Filed: Nov. 20, 2006

(65) Prior Publication Data

US 2007/0150910 A1 Jun. 28, 2007

(30) Foreign Application Priority Data

Dec. 26, 2005 (JP) ............................ P2005-373106

(51) Int. Cl.
*H02K 5/24* (2006.01)
(52) U.S. Cl. .................... 310/51; 74/573 R; 360/99.08
(58) Field of Classification Search ................. 310/51, 310/67 R; 360/99.04, 99.05, 99.07, 99.08; 74/572, 573 R
See application file for complete search history.

(56) References Cited

U.S. PATENT DOCUMENTS 6,098,456 A * 8/2000 Munck ....................... 73/275

| | | | | |
|---|---|---|---|---|
| 6,205,110 B1 * | 3/2001 | Miyamoto et al. | .......... | 369/266 |
| 6,252,319 B1 * | 6/2001 | Sudo et al. | ................. | 310/67 R |
| 6,441,522 B1 * | 8/2002 | Scott | ..................... | 310/156.23 |
| 6,492,750 B2 * | 12/2002 | Kikuchi et al. | ................. | 310/51 |

FOREIGN PATENT DOCUMENTS

| JP | HEI4-312244 | 11/1992 |
|---|---|---|
| JP | 11-191253 | 7/1999 |
| JP | 2000-132904 | 5/2000 |
| JP | 2001-218416 | 8/2001 |
| JP | 2005-308027 | 11/2005 |
| JP | 2005-331102 | 12/2005 |
| JP | 2007-046771 | 2/2007 |
| WO | WO-01/08149 A1 | 2/2001 |

OTHER PUBLICATIONS

Japanese Office Action issued Oct. 7, 2008 for corresponding Japanese Application No. 2005-373106.

* cited by examiner

*Primary Examiner*—Dang D Le
(74) *Attorney, Agent, or Firm*—Rader, Fishman & Grauer PLLC

(57) ABSTRACT

An automatic balancing apparatus is disclosed. The automatic balancing apparatus includes a plurality of magnets, magnetic fluid, and a rotatable housing. The magnets function as balancers. The rotatable housing has a moving path disposed along a peripheral direction of the rotation. Each of the magnets is moved through the moving path. The rotatable housing accommodates the magnets and the magnetic fluid.

32 Claims, 32 Drawing Sheets

AUTOMATIC BALANCING APPARATUS, ROTATING APPARATUS, DISC DRIVE APPARATUS, AND BALANCER

CROSS REFERENCES TO RELATED APPLICATIONS

The present invention contains subject matter related to Japanese Patent Application JP 2005-373106 filed in the Japanese Patent Office on Dec. 26, 2005, the entire contents of which being incorporated herein by reference.

BACKGROUND OF THE INVENTION

1. Field of the Invention

The present invention relates to an automatic balancing apparatus that balances the rotation of an object, a rotating apparatus on which the automatic balancing apparatus is mounted, a disc drive apparatus, and a balancer that is mounted in an automatic balancing apparatus.

2. Description of the Related Art

When a disc such as a record medium is rotated on a turn table of a disc drive apparatus such as an optical disc drive apparatus or a magnetic disc drive apparatus that records and/or reproduces for example data, the rotation of the disc may be unbalanced. As a result, the stability of recording/reproducing may decrease.

A technology of improving the balance of the rotation of a disc has been proposed for example in Japanese Patent Application Laid-Open No. Hei4-312244, paragraph (0006), FIG. 1. In this related art reference, a disc-shaped member having a space portion that accommodates magnetic fluid as a balancer is disposed so that it is rotated together with a motor shaft. The disc-shaped member has a boss portion. A ring magnet is mounted on a side circumferential surface of the boss portion. Thus, when the rotation rate of the rotation shaft is low, the magnetic fluid is attracted by the ring magnet so that the disc-shaped member is not unbalanced.

SUMMARY OF THE INVENTION

However, since a balancer made of fluid is lighter than a balancer made of a regular metal ball or the like, although the quietness is secured, it is difficult to balance an object to be handled.

In view of the foregoing, it would be desirable to provide an automatic balancing apparatus that securely balances an object, a rotating apparatus that mounts the automatic balancing apparatus, and so forth.

According to an embodiment of the present invention, there is provided an automatic balancing apparatus. The automatic balancing apparatus includes a plurality of magnets, magnetic fluid, and a rotatable housing. The magnets function as balancers. The rotatable housing has a moving path disposed along a circumferential direction of the rotation. The plurality of magnets is moved through the moving path. The rotatable housing accommodates the individual magnets and the magnetic fluid.

According to this embodiment of the present invention, since the specific gravity of a magnet is as high as that of a metal ball used in the related art, the automatic balancing apparatus can securely balance an object. In addition, since the magnetic fluid clings to the magnets that function as balancers, the magnets are smoothly moved. Thus, noise of a metal ball of the related art can be prevented.

The shape of the moving path, the width of the moving path in the radial direction of the rotation, and the width of the moving path in the direction of the rotational axis are not limited.

Each of the magnets may be formed in an arc block shape along the peripheral direction. The magnets may be formed in a columnar shape. The columnar shape is an angularly cylindrical shape or a circularly cylindrical shape. When the magnets are formed in an angularly cylindrical shape, the number of sides of the angular cylinder is not limited as long as the number of sides is three or greater. When the magnets are formed in a columnar shape, they may be disposed upright in the direction of the rotational axis. Instead, the magnets may be extended in the radial direction.

The moving path allows each of the magnets to be moved while the posture of each of the magnets is maintained. The term "the postures of the magnets are maintained" means that the postures of the magnets are maintained such that they are not left-right reversed or up-down reversed to prevent their magnetization directions from being reversed. Thus, the magnets can be prevented from attracting each other. According to this embodiment, when the magnets are formed in an arc block shape along the peripheral direction, they can be smoothly moved along the moving path.

Each of the magnets may have a first width on a plane nearly perpendicular to a rotational axis of the rotation and in a direction perpendicular to a radial direction of the rotation. The moving path may have a second width smaller than the first width in the radial direction.

Each of the magnets may be magnetized such that they repel each other along the moving path. Thus, the magnets can be prevented from attracting each other. Each of the magnets may be magnetized with the same polarity on the same side in the direction of the rotational axis of the rotation. Each of the magnets may be magnetized such that the same polarity faces each other in the peripheral direction. Each of the magnets may be magnetized such that their polarities are symmetrical with respect to the center of the rotation in the radial direction of the rotation.

Each of the magnets may have a plurality of pairs of magnetic poles. As the number of magnetic poles increases, the number of magnetic flux increases. As a result, a situation of which the magnetic fluid separates from the magnets due to the centrifugal force upon rotation of the housing can be suppressed. In addition, as the number of magnetic poles increases, the magnetic flux generated around the magnets becomes uniform. Thus, since the magnetic fluid uniformly gathers around the magnets, they can be more smoothly moved.

Each of the magnets may have a plurality of pairs of magnetic poles in the peripheral direction of the rotation. Thus, since the magnetic flux becomes equal in the peripheral direction, a magnetic fluid film that stands the centrifugal force acting on the magnets upon rotation of the housing can be formed. As a result, the magnets can be smoothly moved particularly in the peripheral direction. In this case, the magnets may be magnetized either in the radial direction of the rotation or the axial direction thereof. In addition, according to this embodiment, since each magnet has a plurality of pairs of magnetic poles in the peripheral direction, of course, each of the magnets is also magnetized in the peripheral direction.

A yoke may be mounted on each of the magnets. Thus, an optimum magnetic field is generated. As a result, the magnets as balancers and the magnetic fluid that clings to the magnets are optimally operated. In addition, balancers having a complicated outer shape can be easily manufactured.

The yoke may be formed such that magnetic flux of the magnet concentrates on the outer periphery side of the rotation. Thus, although centrifugal force acts on the magnetic fluid upon rotation of the housing, since a magnetic fluid film is formed on the outer periphery side of the magnets, they are smoothly moved. Thus, a problem of which the magnets are not moved before the automatic balancing apparatus balances an object can be solved. In addition, since magnetic flux concentrates on the outer periphery side, the repelling force of the magnetic weakens. As a result, the magnets are easily moved.

The magnet may have an inner periphery surface facing the inner periphery side of the rotation. The yoke may cover only the inner periphery surface. The magnet may have an outer peripheral surface that faces the outer periphery side of the rotation. The yoke may cover the magnet such that only the outer peripheral surface of the magnet is exposed. The yoke may have a magnetic gap on the outer periphery side of the rotation.

According to an embodiment of the present invention, the housing has a moving path in the peripheral direction of the rotation. The magnets and the magnetic fluid are moved through the moving path. Each yoke is formed in an arc block shape or a columnar shape along the peripheral direction. Thus, it is not necessary to form the magnet in a particular shape. Instead, the yoke may be formed in a particular shape. As a result, the magnet can be easily machined and manufactured.

Each of the magnets may also have a resin member which coats the magnet. Thus, balancers having a complicated outer shape can be easily manufactured. In addition, the magnet coated with a resin member contacts the magnetic fluid in a low frictional state, namely with a low frictional constant. Thus, the magnets can be smoothly moved.

Each of the magnets may have an outer peripheral portion having a curved surface. According to this embodiment, the number of corners and sides of the magnet is decreased as much as possible. As a result, the magnets can be easily moved. Thus, the response of the operation improves. Even if the magnetic poles has a curved path surface, the same effect can be achieved.

In particular, when the magnet has an outer peripheral portion having a curved surface, since the frictional coefficient of the outer peripheral portion decreases, after the centrifugal force causes the outer peripheral portion of the magnet contacts the outer peripheral wall surface of the moving path, the magnet is securely moved until the automatic balancing apparatus balances the object.

Each of the magnets may have a taper surface formed on the outer periphery side of the rotation. The width in the axial direction of the rotation gradually decreases outwardly on the outer periphery side. Thus, as with the foregoing embodiment, since the frictional coefficient on the outer periphery side decreases, the magnets can be securely moved until the automatic balancing apparatus balances the object. The term "gradually" includes meaning of "continuously", "step by step", or a combination of them.

The moving path may have a taper wall surface formed on the outer peripheral surface of the rotation. The width in the axial direction of the rotation gradually decreases outwardly on the outer periphery side of the rotation. Thus, as with the foregoing embodiment, since the frictional coefficient on the outer periphery side decreases, the magnets can be securely moved until the automatic balancing apparatus becomes the balanced state.

The moving path may have an air path which extends from the inner periphery side of the rotation to the outer periphery side. Thus, when centrifugal force causes the magnet to move to the outer periphery side, there is no pressure difference between the inner periphery side and the outer periphery side of the moving path. As a result, the magnet can be easily moved. The air path may extend in a slightly inclined direction, not the radial direction of the rotation.

The moving path may have an outer peripheral wall surface on the outer periphery side of the rotation. The amount of the magnetic fluid may be set such that centrifugal force of the rotation causes the magnetic fluid to flow to the outer periphery side of the rotation and a film of the magnetic fluid to be formed on the entire periphery of the outer peripheral wall surface. When the magnetic fluid film is regularly formed on the entire periphery of the outer peripheral wall surface of the moving path, the magnet is smoothly moved. Since the magnetic fluid pressed by the magnet due to the centrifugal force that takes place upon rotation of the housing is also subject to the pressure of the adjacent magnetic fluid film, the magnetic fluid is regularly present on the outer periphery side of the magnet. Thus, the magnetic fluid film allows the friction on the outer periphery side to decrease.

Instead, the amount of the magnetic fluid may be set such that the film thickness in the radial direction of the magnetic fluid at a portion pressed by the magnet due to the centrifugal force upon rotation of the housing becomes nearly the same as the film thickness in the radial direction of the magnetic fluid at a portion not pressed by the magnet. Since the magnetic fluid gathers in the direction of which the magnet is finally moved, it is thought that the film thickness of the magnetic fluid that gathers is greater than the film thickness of the magnetic fluid that does not gather. In this case, the magnetic fluid is supplied for an amount that allows the thick film portion to be pressed by the magnet due to the centrifugal force and the film thickness to be equal on the entire periphery of the outer peripheral wall surface. Thus, the magnetic fluid film can be prevented from being pressed and lost by the magnet due to the centrifugal force.

The moving path may have a sticking prevention section which prevents each of the magnets from sticking to the moving path. Thus, the sticking prevention section prevents the magnets from sticking to the path surface of the moving path due to the surface tension or the like of the magnetic fluid. As a result, the magnet can be smoothly moved.

The sticking prevention section may be made of grooves or depressed and raised portions formed on the path surface of the moving path. The path surface of the moving path may be formed with predetermined surface roughness. The term "be formed with predetermined surface roughness" means that the surface of the moving path is roughly formed intentionally. The term "depressed and raised portions" means depressed and raised portions that can be seen by human eyes. The term "be formed with predetermined surface roughness" includes a mode of which such depressed and raised portions are formed.

The automatic balancing apparatus may include an attenuation member which attenuates moving force of each of the magnet. The "moving force" means centrifugal force or the like that acts on the magnet upon rotation of the housing. When the frictional force that acts on the magnet is too weak, the magnet is continuously moved against the housing upon rotation thereof. As a result, the magnet may generate self-induced oscillation. With the attenuation member, the integrated frictional force that acts on the magnet, namely, the viscous damping coefficient of the magnet increases. As a result, the magnet can be prevented from self-induced oscillation.

The attenuation member may be a member which generates an eddy current as each of the magnets is moved. The attenuation member generates the eddy current using a variance of the magnetic field by the magnets moving. The attenuation member may be made of a non-magnetic substance.

The housing may be a member that generates an eddy current as each of the magnets is moved. Since the housing functions as an attenuation member, the automatic balancing apparatus can be downsized and slimmed.

According to an embodiment of the present invention, there is provided a rotating apparatus. The rotating apparatus includes a plurality of magnets, magnetic fluid, a housing, and a drive mechanism. The plurality of magnets functions as balancers. The housing accommodates the plurality of magnets and the magnetic fluid. The drive mechanism rotates the housing.

The drive mechanism may be achieved in various modes. Examples of the drive mechanism include an electromagnetic motor, a ultrasonic motor, and an electrostatic motor, but not limited thereto.

The drive mechanism may be aligned with the housing in the axial direction of the rotation and generates a leaked magnetic field in the axial direction. The magnets may be magnetized in the radial direction of the rotation. The drive mechanism may be aligned with the housing in the radial direction of the rotation and generates a leaked magnetic field in the radial direction. The magnets may be magnetized in the radial direction. Thus, the influence of the leaked magnetic field caused by the drive mechanism against the magnet can be alleviated.

According to an embodiment of the present invention, there is provided a disc drive apparatus. The disc drive apparatus includes a holding section, a plurality of magnets, magnetic fluid, a housing, and a drive mechanism. The holding section holds a disc on which a signal is recordable. The plurality of magnets functions as balancers. The housing accommodates the plurality of magnets and the magnetic fluid. The drive mechanism rotates the holding section and the housing together.

The term "disc drive apparatus" is a device that rotates and drives a disc to record a signal to the disc and/or reproduce a signal therefrom.

According to an embodiment of the present invention, there is provided a balancer used for an automatic balancing apparatus. The automatic balancing apparatus balances the rotation of an object. The balancer includes a magnet and a yoke. The yoke is mounted on the magnet. Thus, an optimum magnetic field is generated. As a result, the magnet as a balancer and the magnetic fluid that clings to the magnet are optimally operated. In addition, a balancer having a complicated outer shape can be easily manufactured.

As described above, in the automatic balancing apparatus according to embodiments of the present invention, it can securely balance an object while maintaining quietness.

These and other objects, features and advantages of the present invention will become more apparent in light of the following detailed description of best mode embodiments thereof, as illustrated in the accompanying drawings.

DESCRIPTION OF PREFERRED EMBODIMENTS

Next, with reference to the accompanying drawings, embodiments of the present invention will be described.

Figure 1:
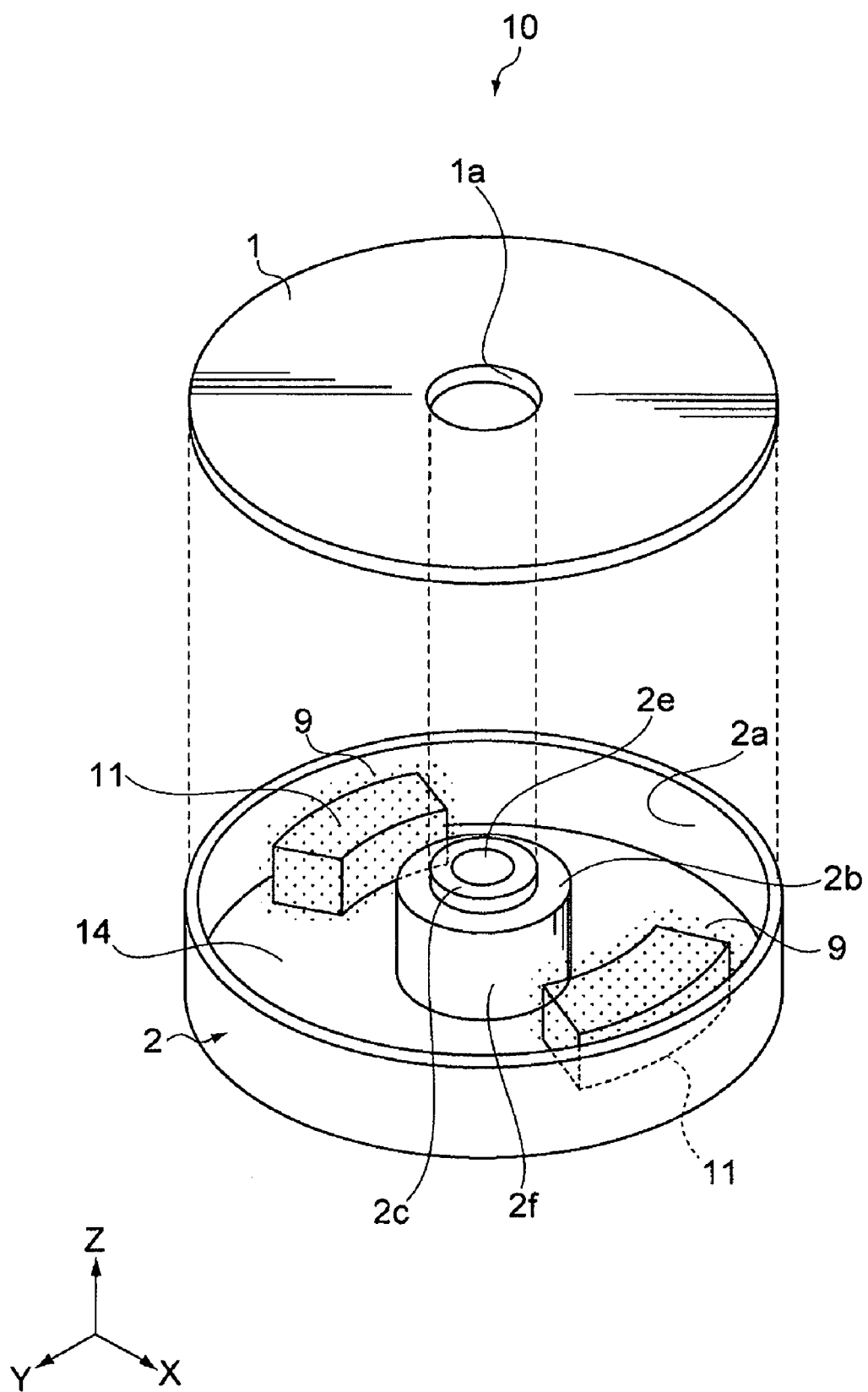
FIG. 1 is an exploded perspective view showing an automatic balancing apparatus according to an embodiment of the present invention.
Figure 2:
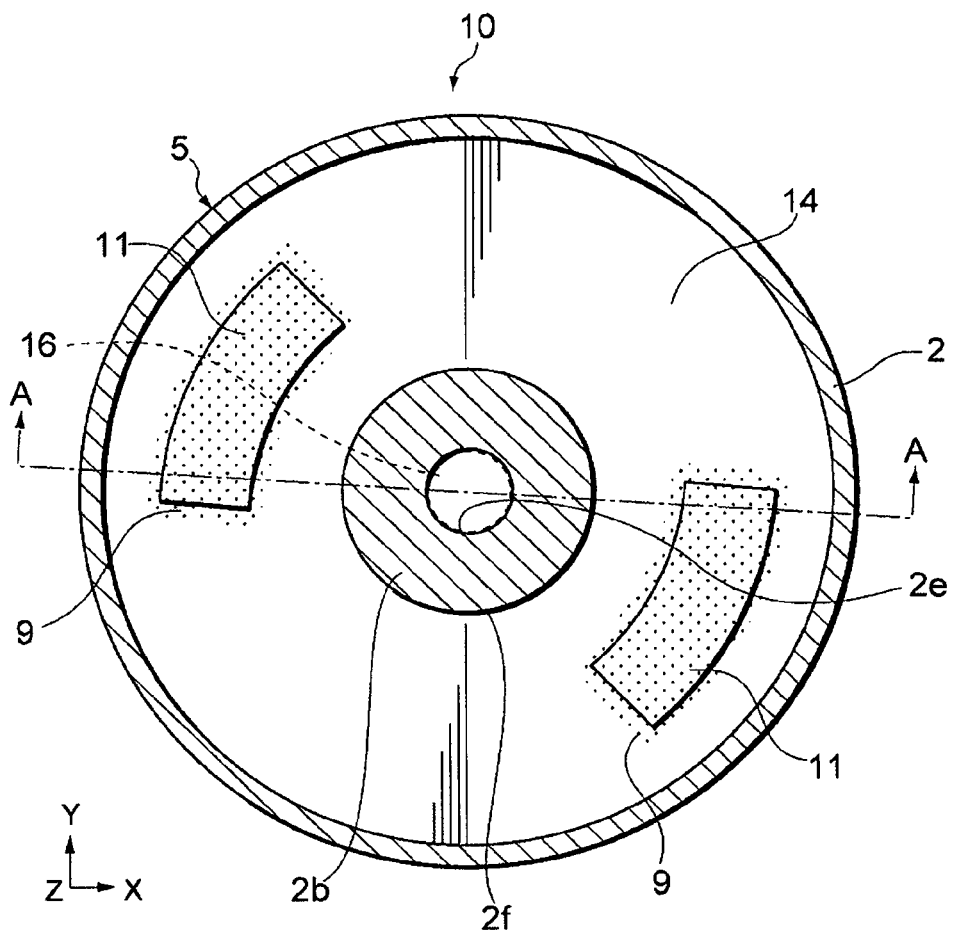
FIG. 2 is a sectional view showing the automatic balancing apparatus shown in FIG. 1.
Figure 3:
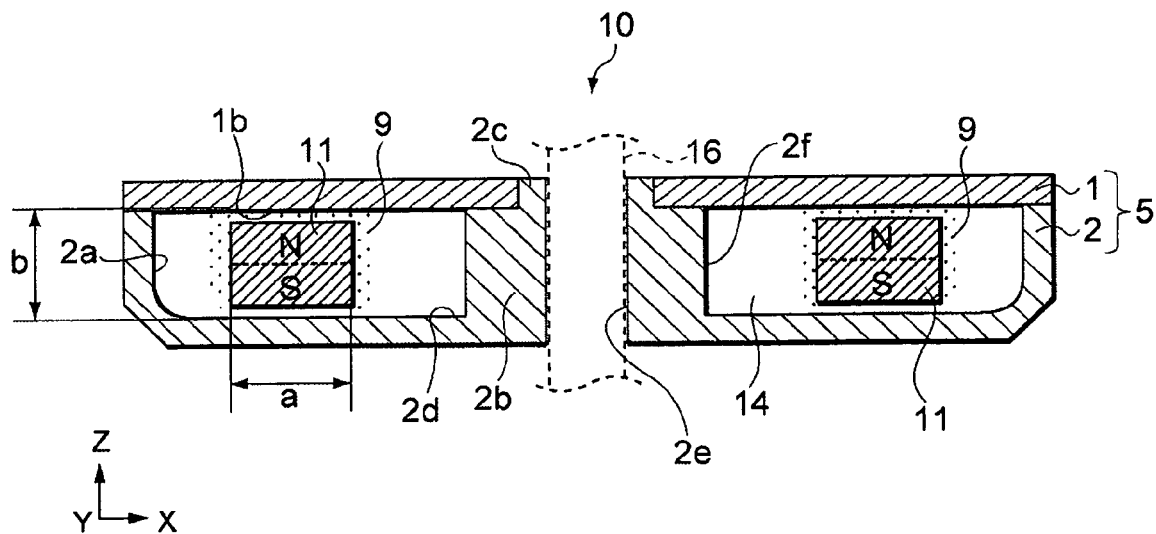
FIG. 3 is a sectional view taken along line A-A of FIG. 2.

FIG. 1 is an exploded perspective view showing an automatic balancing apparatus according to an embodiment of the present invention. FIG. 2 is a sectional view showing the automatic balancing apparatus shown in FIG. 1. FIG. 3 is a sectional view taken along line A-A of FIG. 2. The automatic balancing apparatus 10 has a case 2 that accommodates a plurality of magnets 11 that function as balancers. The case 2 has an upper opening. By placing a cover 1 on the upper opening, a housing 5 is completed. A boss portion 2b is formed at the center of the inside of the housing 5. The boss portion 2b protrudes upwardly. A moving path 14 is formed in a space between an outer peripheral wall surface 2a in the housing 5 and a side surface 2f of the boss portion 2b. The magnets 11 are moved through the moving path 14. A lower path surface 2d and an upper path surface 1b (rear surface of the cover 1) of the moving path 14 define the height of the moving path 14.

A flange 2c is formed on the upper surface of the boss portion 2b. The flange 2c fits a hole 1a (see FIG. 1) formed nearly at the center of the cover 1. Examples of the connecting method of the cover 1 and the case 2 includes welding, clamping, and laser bonding, but not limited thereto. The cover 1 and the case 2 is made of a material that is not affected by magnetism of the magnets 11. The examples of the material include plastics such as polycarbonate, an aluminum alloy, a bronze alloy, and ceramics.

As shown in FIG. 3, the condition of a>b is kept where a denotes the width in the radial direction of the magnet 11 and b denotes the width (height) in the axial direction of the moving path 14. In this condition, the magnets 11 are prevented from turning over, causing the magnetizing directions of the magnets 11 to be reversed.

Figure 48:
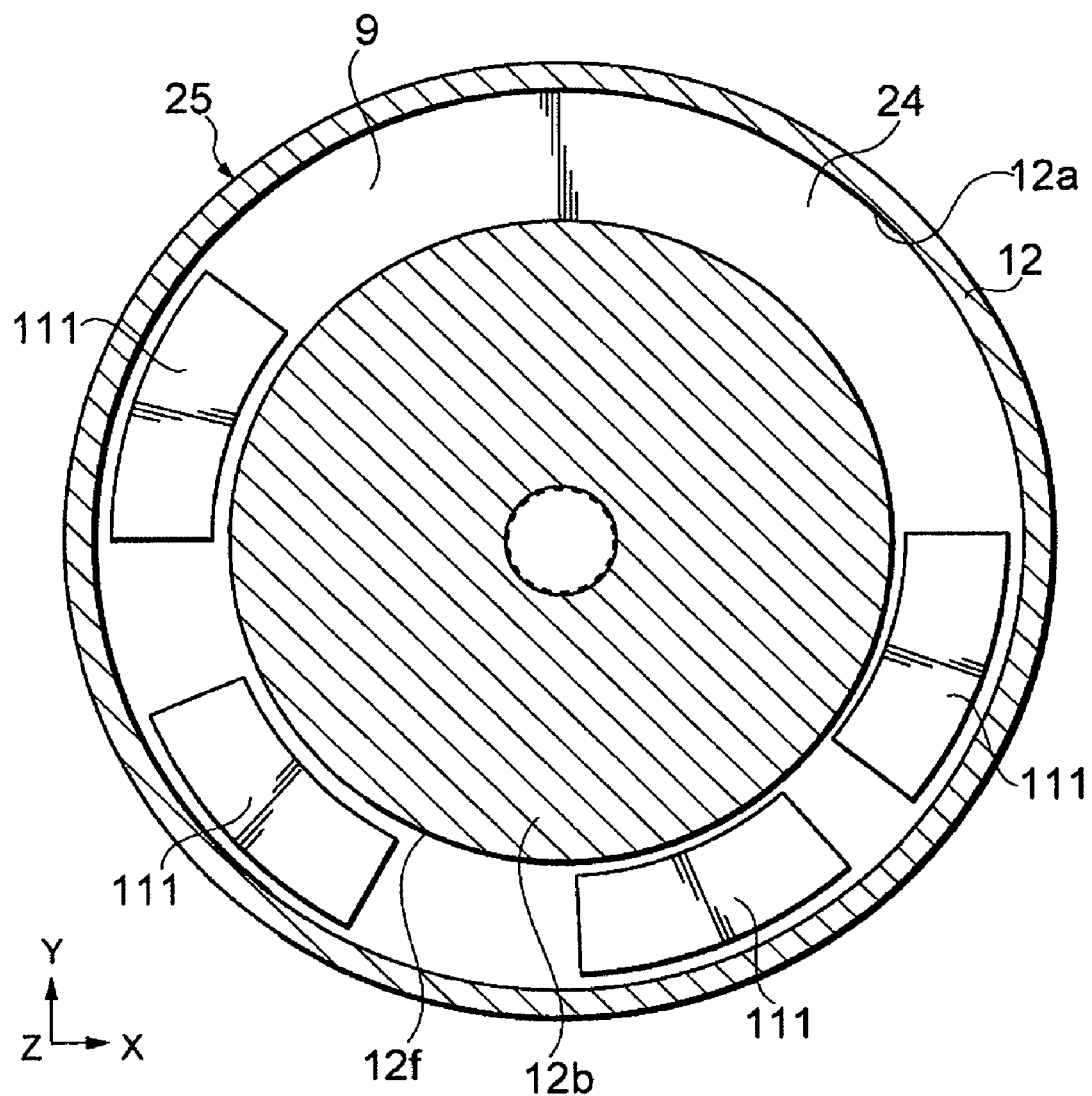
FIG. 48 is a sectional view showing an automatic balancing apparatus having four magnets.

As shown in FIGS. 2 and 3, a rotational shaft member 16 is inserted and fixed into a through-hole 2e formed in the boss portion 2b. As will be described later, the rotational shaft member 16 is a rotational shaft member of a motor disposed in a device to which the automatic balancing apparatus 10 is mounted. Instead, the rotational shaft member 16 may be a separate coaxial shaft member. The magnets 11 are formed in an arc block shape as a part of a ring. For example, two magnets 11 are disposed. As long as two or more magnets 11 function as balancers, the number of magnets 11 is not restricted. For example, as shown in FIG. 48, four magnets 111 may be disposed. As shown in FIG. 3, the two magnets 11 are magnetized in the direction of the rotation of the housing 5 (Z direction) so that the same magnetic poles orient the same direction. Thus, when the magnets 11 approach each other, they repel each other. Examples of the material of the magnet 11 include ferrite and neodymium, but not limited thereto.

Magnetic fluid 9 clings to the magnets 11 by their magnetic force. Instead of the magnetic fluid 9, magnetorheological fluid may be used. Examples of solvent of the magnetic fluid 9 include water, oil, and sodium polytungstate, but not limited thereto. Since the magnetic fluid 9 clings to the magnets 11, when the automatic balancing apparatus 10 does not operate as shown in FIGS. 2 and 3, the magnets 11 float in the moving path 14. Thus, it is necessary to fill the magnetic fluid 9 in the moving path 14 for an amount that allows the magnets 11 to float in the moving path 14.

Figure 4:
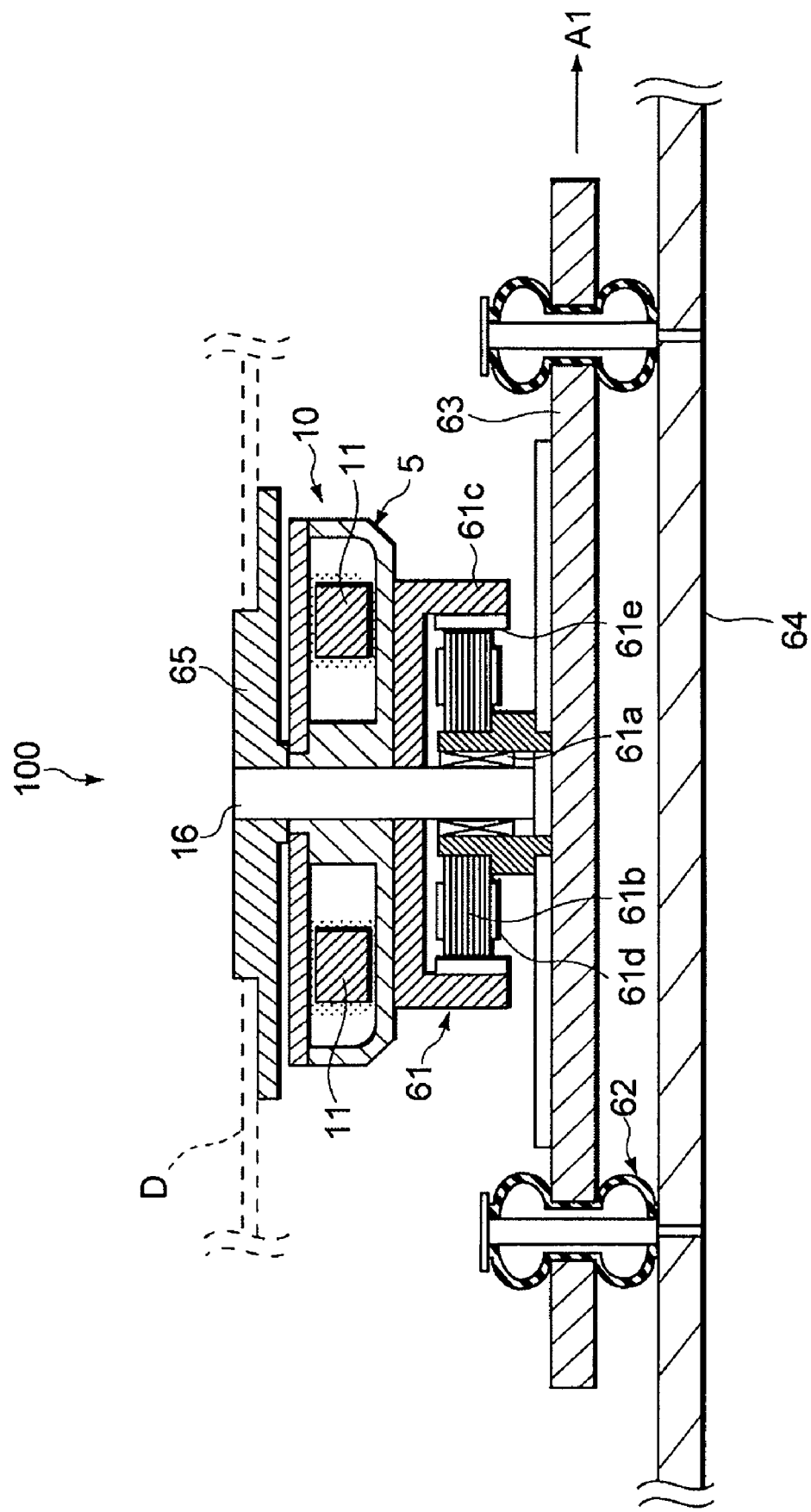
FIG. 4 is a sectional view showing a disc drive apparatus in which the automatic balancing apparatus is mounted.

FIG. 4 is a sectional view showing a disc drive apparatus in which the automatic balancing apparatus 10 is mounted.

The disc drive apparatus 100 has a motor 61. A turn table 65 is disposed at an upper end portion of the rotational shaft member 16 of the motor 61. A disc D is mounted on the turn table 65. The motor 61 has a stator 61b, a rotor 61c, and the rotational shaft member 16. The stator 61b has a coil 61d in which for example a drive current flows. The rotor 61c has a magnet 61e. The motor 61 is rotatable through a bearing 61a. As described above, the automatic balancing apparatus 10 is mounted to the rotational shaft member 16 so that the automatic balancing apparatus 10 is rotatable together with the rotational shaft member 16. The motor 61 is supported by a sub chassis 63. The sub chassis 63 is supported by a main chassis 64 through an elastic members 62 made of a high polymer material such as rubber or a metal member. In this manner, a vibration system is constituted. In this example, the vibration system includes all vibrations of members disposed above the main chassis 64. The resonance frequency of the vibration system caused by deformation of the elastic member 62 is smaller than the rotation frequency of the disc D.

Examples of the disc include an optical disc to and from which a signal can be recorded and reproduced by an optical method such as a CD (Compact Disc), a DVD (Digital Versatile Disc), a Blu-ray disc, a hologram disc, a magneto-optical disc such as an MO (Magneto Optical Disc) or an MD (Mini-Disc), and a magnetic disc such as a hard disk.

Next, the operation of the automatic balancing apparatus 10 will be described. FIG. 5 shows a sequence of operation states of the automatic balancing apparatus 10.

Figure 5A:
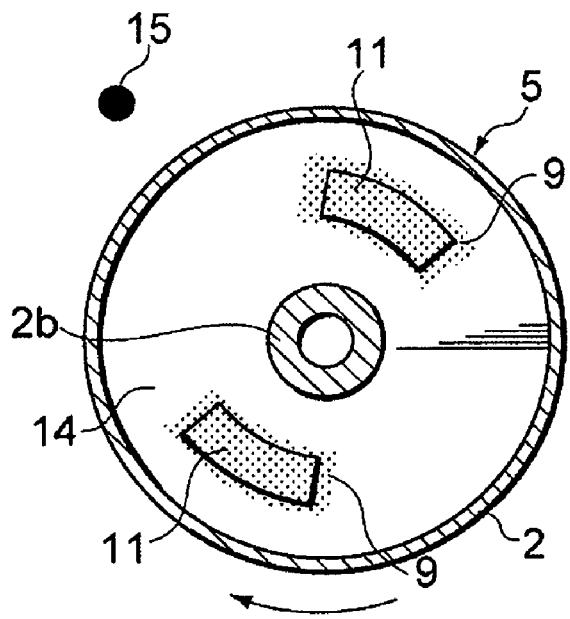
FIG. 5A and FIG. 5B are schematic diagrams showing a sequence of operation states of the automatic balancing apparatus.

A disc D is placed on the turn table 65. When the rotation of the motor 61 starts, the vibration system starts vibrating. As shown in FIG. 5A, it is assumed that the disc D has an unbalance portion 15 and is eccentric. The cause of which the unbalance portion 15 takes place may not be limited to the disc D, but other members of the disc drive apparatus 100. When the motor 61 rotates in the initial rotation state (in the low speed state), the magnets 11 and magnetic fluid 9 start rotating together. This is because the force of viscosity of the magnetic fluid 9 or the frictional force of the magnets 11 that acts on for example the upper path surface 1b or the lower path surface 2d of the moving path 14 through the magnetic fluid 9 are greater than the centrifugal force due to the rotation of the housing 5.

Figure 5B:
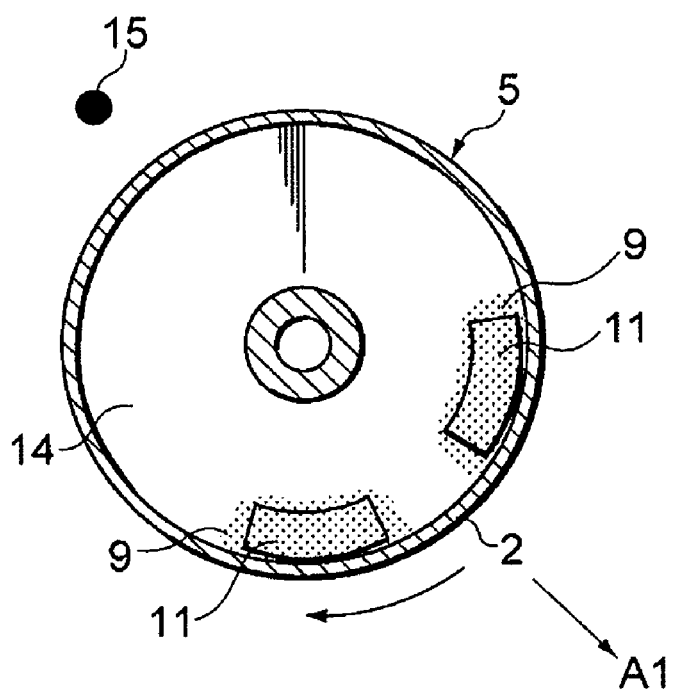

When the rotation rate of the motor 61 increases, the magnets 11 and the magnetic fluid 9 are moved outwardly in the moving path 14 by the centrifugal force. As shown in FIG. 5B, when the rotation frequency of the motor 61 exceeds the resonance frequency of the vibration system and the phase of the unbalance portion 15 nearly becomes the reverse of the phase of the vibration system, the displacement direction A1 of the elastic member 62 nearly becomes the reverse of the position of the unbalance portion 15. At this point, the center of gravity of all the magnets 11 is subject to the force in the direction A1. In addition, the magnetic fluid 9 is also moved toward the outer peripheral wall surface 2a of the moving path 14. When the magnets 11 are relatively stopped against the rotation of the housing 5, namely the magnets 11 and the housing 5 rotate together, the unbalance portion is cancelled. Thus, the magnets 11 and the housing 5 are balanced. The rotation rate of the disc D at this point is the rotation rate at which a signal is recorded or reproduced. The example of the rotation rate at this point is 3000 to 7000 rpm, but not limited thereto.

When the rotation rate of the motor 61 decreases and the operation thereof stops, the magnets 11 stop as they are (as shown in FIG. 5B). Instead, depending on the posture of the automatic balancing apparatus 10, the magnets 11 are moved to arbitrary positions due to the influence of the gravity. Even if the magnets 11 are moved to arbitrary positions, since the condition of a>b is kept (see FIG. 3), the magnetization directions of the magnets are not reversed. Thus, the magnets 11 do not attract each other. In other words, while the postures of the magnets 11 are maintained, they are moved in the moving path 14.

As described above, in the automatic balancing apparatus 10 according to this embodiment, since the specific gravity of the magnets 11 is as high as that of metal balls of the related art, the magnets 11 and the housing 5 are securely balanced. In addition, since the magnetic fluid 9 clings to the magnets 11 that function as balancers, the magnets 11 are smoothly moved. Thus, noise of metal balls of the related art can be reduced.

In particular, if the device to which the automatic balancing apparatus 10 is mounted has a recording function, it is very advantageous to reduce noise. When metal balls operate as balancers like the relate art, there is a risk of which noise may be recoded. Examples of the device having the recording function include a voice recorder and a portable audio/visual recording device.

When the specific gravity of the magnets 11 is high, even if the diameter of the housing 5 is small, the magnets 11 can cancel the unbalance amount. As a result, the automatic balancing apparatus 10 can be downsized.

Since the magnets 11 according to this embodiment are formed in an arc block shape, they do not have a flat surface. Thus, the magnets 11 are smoothly moved.

Figure 6:
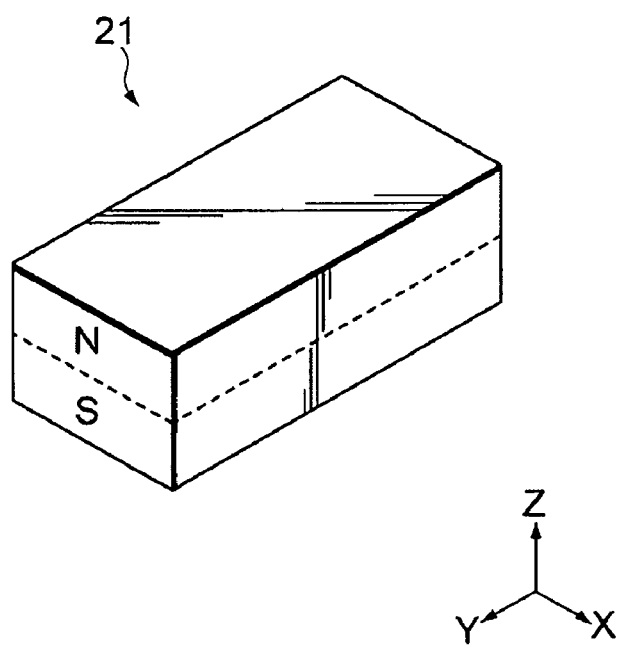
FIG. 6 is a perspective view showing a magnet formed in a rectangular parallelepiped shape according to another embodiment of the present invention.
Figure 7:
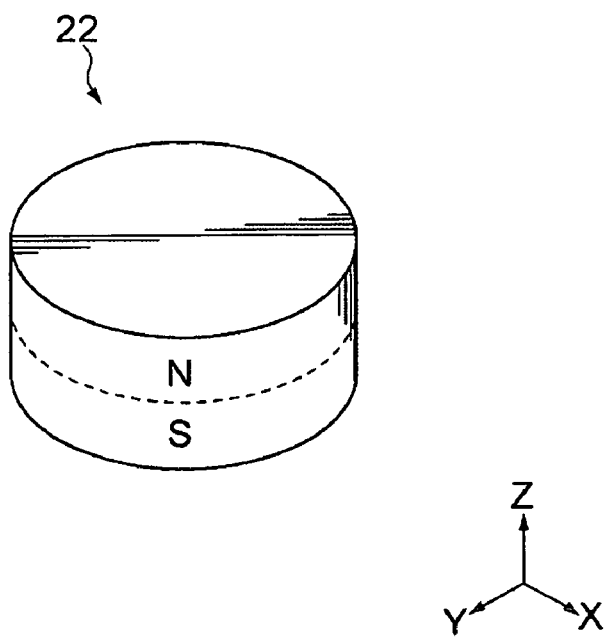
FIG. 7 is a perspective view showing a magnet formed in a circularly cylindrical shape according to another embodiment of the present invention.
Figure 8:
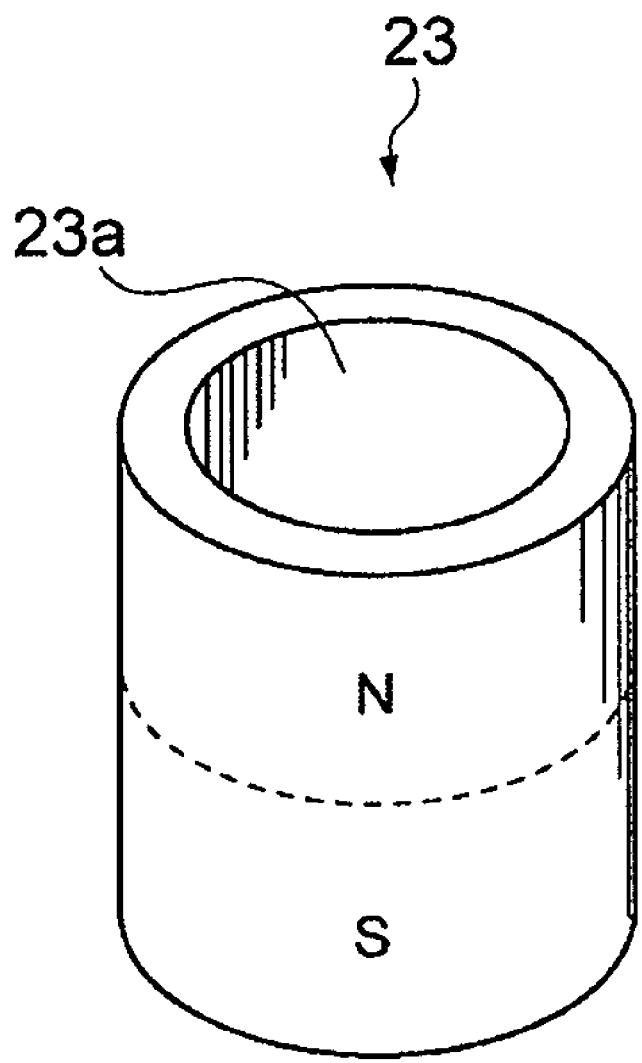
FIG. 8 is a perspective view showing a magnet formed in a tubular shape having a through-hole according to another embodiment of the present invention.
Figure 8:
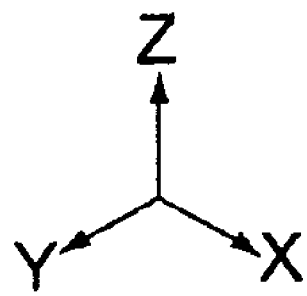

FIG. 6, FIG. 7, and FIG. 8 are perspective views showing magnets according to another embodiment of the present invention. Unlike the magnets 11 formed in an arc block shape, a magnet 21 shown in FIG. 6 is formed in a rectangular parallelepiped shape. In this case, the magnet 21 is magnetized in the Z direction (the direction of the rotational axis).

A magnet 22 shown in FIG. 7 is formed in a circularly cylindrical shape. In this case, the magnet 22 is magnetized in the Z direction (the direction of the rotational axis).

A magnet 23 shown in FIG. 8 is formed in a tubular shape having a through-hole 23a. The magnet 23 is magnetized in the direction of the through-hole 23a that is the Z direction. In this structure, when an automatic balancing apparatus is manufactured, by appropriately adjusting the size and so forth of the through-hole 23a, the balance amount can be controlled. Instead of the through-hole 23a, a depressed portion or a groove may be formed in the magnet. Likewise, the magnet 11 formed in an arc block shape may be hollow or tubular.

Besides those shaped, the magnet may be formed in a spherical shape. Instead, the magnet may be formed in a polygonally angularly cylindrical shape other than a quadrangularly cylindrical shape or a polygonally cone shape. Instead, the magnet may be formed in another solid shape. If the magnets are formed in a spherical shape, when they are moved in the moving path 14, their magnetization directions may change, causing a plurality of magnets to attract each other. However, in this case, by properly selecting the magnetic force of magnets, the number of magnets, the viscosity of magnetic fluid, and so forth, when the automatic balancing apparatus operates, the magnets repel each other due to the centrifugal force that act thereon.

Figure 9:
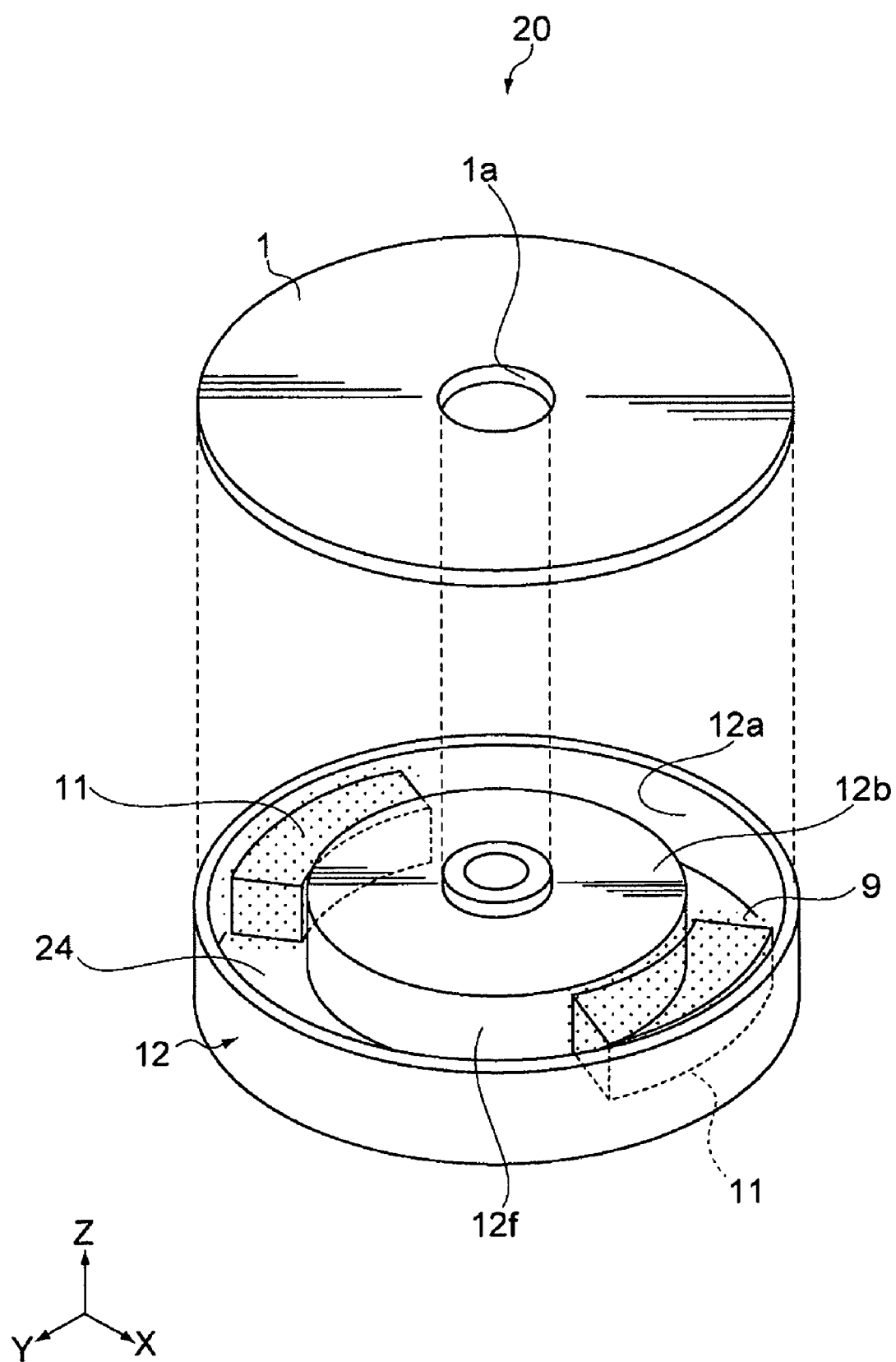
FIG. 9 is a perspective view showing an automatic balancing apparatus according to another embodiment of the present invention.
Figure 10:
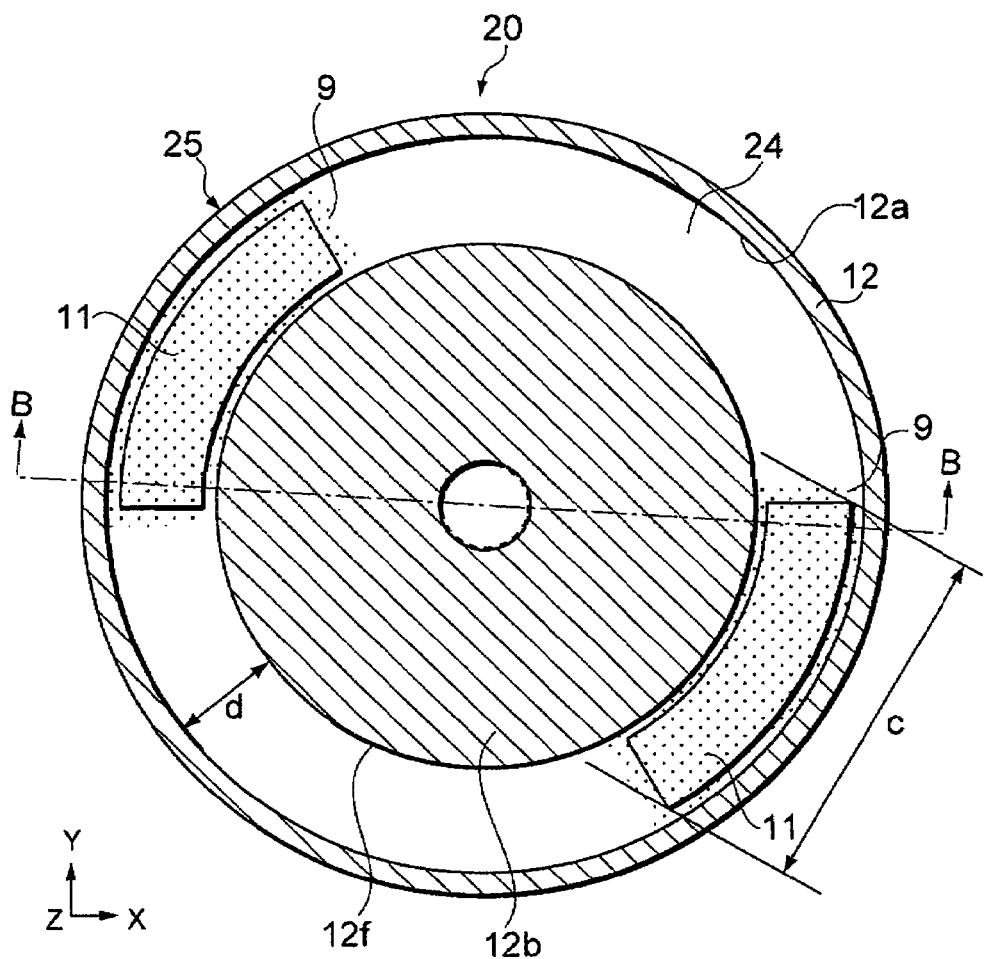
FIG. 10 is a sectional view showing the automatic balancing apparatus shown in FIG. 9.
Figure 11:
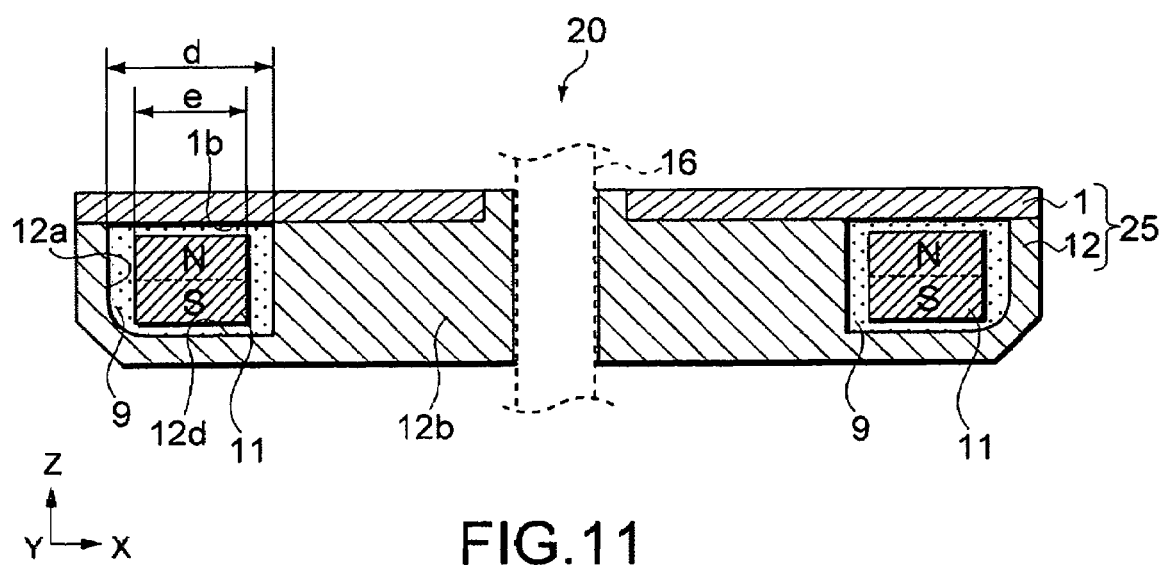
FIG. 11 is a sectional view taken along line B-B of FIG. 10.

FIG. 9 is a perspective view showing an automatic balancing apparatus according to another embodiment of the present invention. FIG. 10 is a sectional view showing the automatic balancing apparatus shown in FIG. 9. FIG. 11 is a sectional view taken along line B-B of FIG. 10. In the following description, for simplicity, in this embodiment, similar portions and functions to those in the foregoing embodiment will be described in brief or omitted. Their different points will be mainly described.

The automatic balancing apparatus 20 has a case 12. The case 12 has a boss portion 12b whose diameter is larger than that of the boss portion 2b shown in FIG. 1 and so forth. Thus, the width in the radial direction of a moving path 24 formed along the periphery of the rotation is narrow. In other words, the distance between an outer peripheral wall surface 12a of a housing 25 and the boss portion 12b is narrower than the width of the moving path 14 shown in FIG. 1 and so forth. Magnets 11 formed in an arc block shape are disposed in a moving path 24. The magnets 11 are magnetized in the direction of the rotation axis (the direction in which a rotational shaft member 16 extends). Magnetic fluid clings to the magnets 11.

In particular, in this embodiment, as shown in FIG. 10, the magnets 11 have a width c on a plane nearly perpendicular to the rotational axis, namely on a plane of which the moving path 24 is formed, and in a direction perpendicular to the radial direction of the rotation. In addition, the moving path 24 has a width d in the radial direction of the rotation. In this case, as long as the condition of c>d is kept, the magnets 11 do not rotate on the plane. In other words, the magnets 11 are smoothly moved along the moving path 24 (peripheral directions) while their postures are maintained without being rotated. Of course, with respect to the relationship of the widths d and e in the radial direction of the magnets 11 shown in FIG. 11, the condition d>e is kept.

In addition, according to this embodiment, since the magnets 11 are formed in an arc block shape corresponding to a ring shape of the moving path 24, they are more smoothly moved while quietness is maintained.

Besides magnets formed in an arc block shape, magnets formed in a spherical shape or an angularly cylindrical shape may be disposed in the housing 25 shown in FIG. 9 to FIG. 11.

Figure 12:
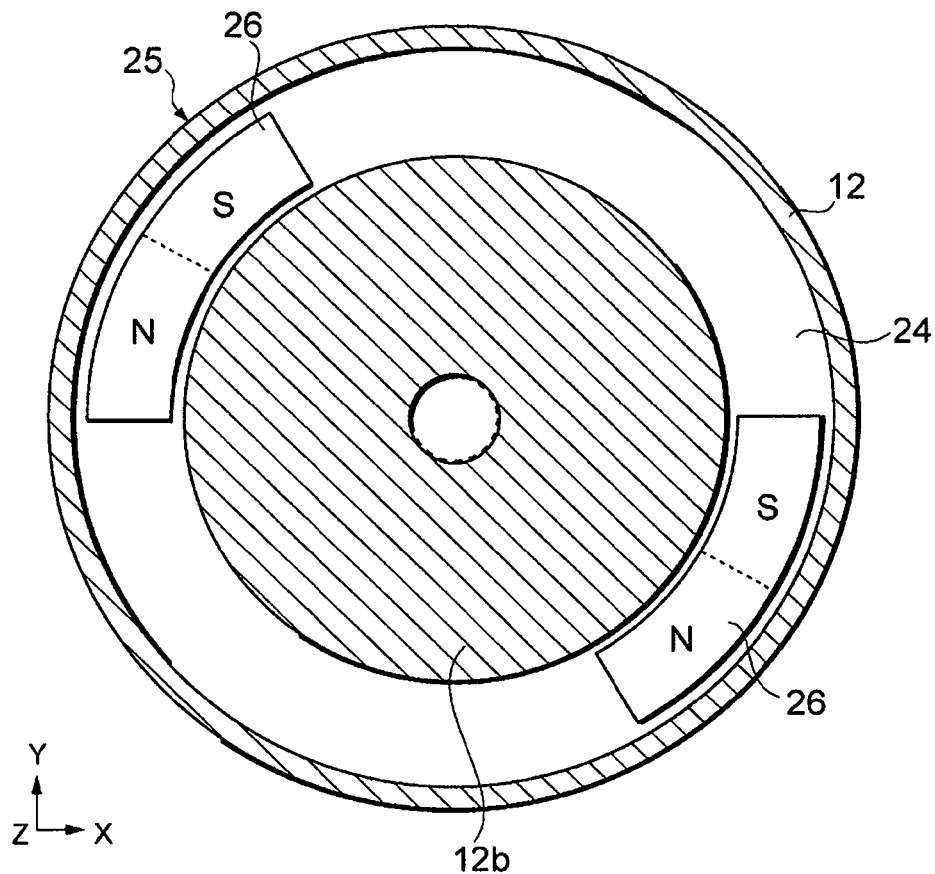
FIG. 12 is a sectional view showing an automatic balancing apparatus of which magnets according to another embodiment are disposed in a housing shown in FIG. 9 to FIG. 11.

FIG. 12 shows an example of which magnets according to another embodiment are disposed in the housing 25 shown in FIG. 9 to FIG. 11. In FIG. 12, the illustration of magnetic fluid is omitted. Magnets 26 are magnetized along a moving path 24, namely in the peripheral direction of the rotation. In this case, the magnets 26 are magnetized so that the same magnetic poles are oppositely disposed, causing the magnets that approach to repel each other. Thus, the magnets 26 can be prevented from attracting each other in the moving path 24. However, in this embodiment, to prevent the magnets 26 from attracting each other, it is necessary to limit the number of magnets 26 to an even number.

Figure 13:
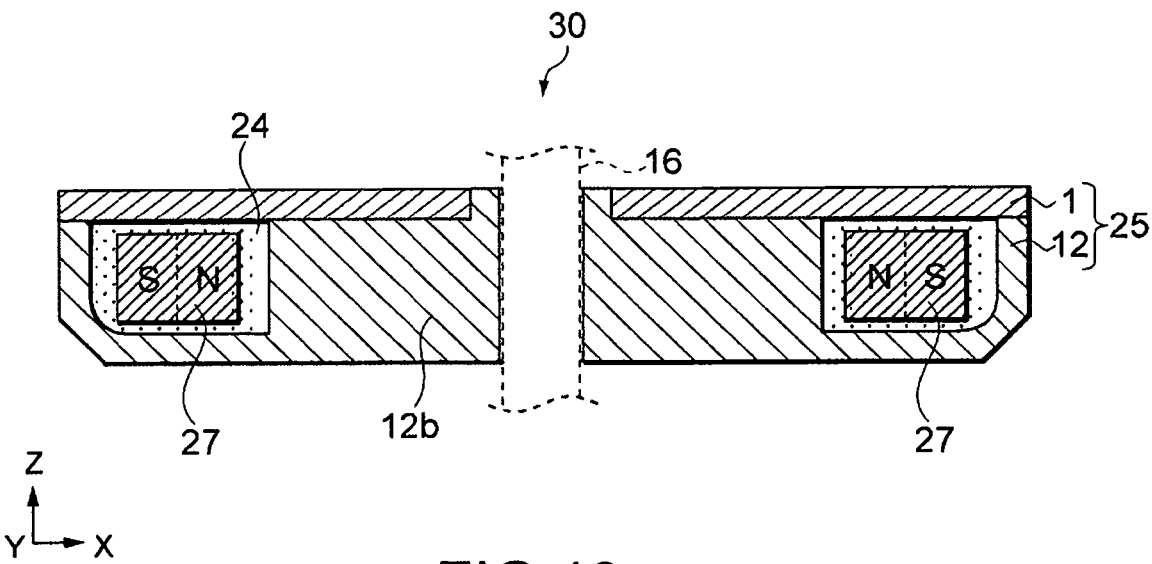
FIG. 13 is a sectional view showing an automatic balancing apparatus of which magnets according to another embodiment are disposed in the housing shown in FIG. 9 to FIG. 11.

FIG. 13 shows an automatic balancing apparatus of which magnets according to another embodiment are disposed in the housing 25 shown in FIG. 9 to FIG. 11. In this embodiment, the automatic balancing apparatus is denoted by reference numeral 30. Magnets 27 disposed in the automatic balancing apparatus 30 are magnetized in the radial direction. In this case, the magnets 27 are magnetized so that magnetic poles are symmetrical with respect to the center of the rotation in the radial direction shown in FIG. 13, causing the magnets 27 that approach to repel each other. In this structure, the magnets 27 can be prevented from attracting each other in the moving path 24.

Figure 14A:
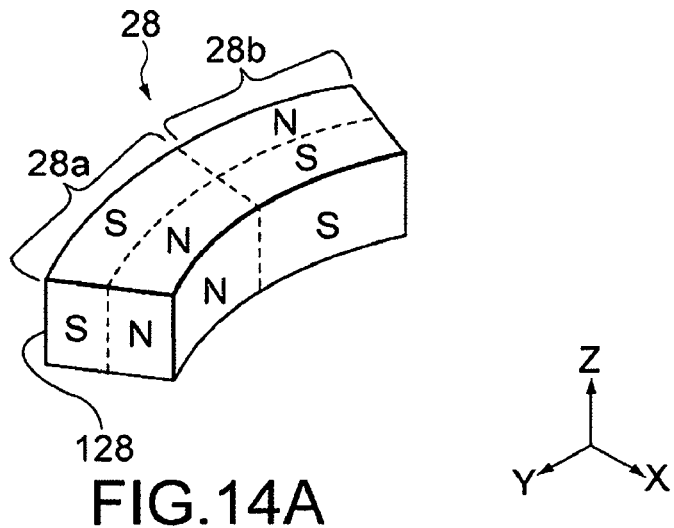
FIG. 14A, FIG. 14B, and FIG. 14C are perspective views showing magnets having a plurality of pairs of magnetic poles according to another embodiment of the present invention.
Figure 14B:
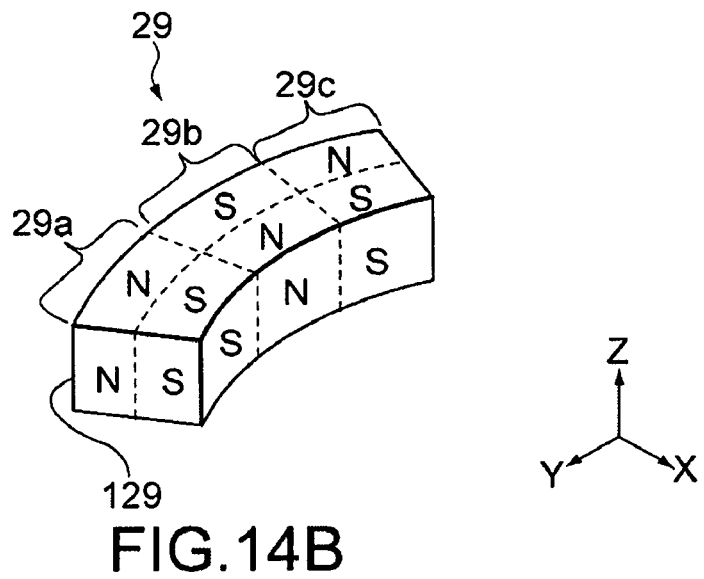
Figure 14C:
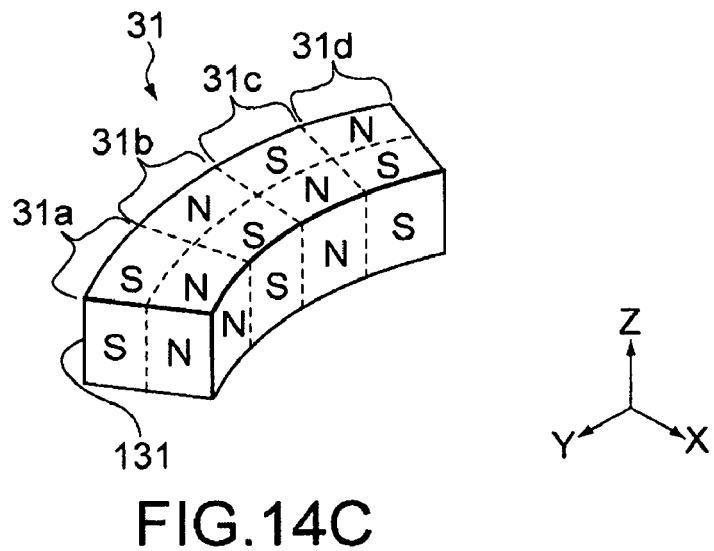

FIG. 14A, FIG. 14B, and FIG. 14C are perspective views showing magnets according to another embodiment of the present invention. A magnet 28 shown in FIG. 14A is magnetized in the radial direction (X direction) and has two pairs of magnetic poles 28a and 28d in the peripheral direction (Y direction). Magnets 29 shown in FIG. 14B are magnetized in the radial direction and has three pairs of magnetic poles 29a, 29b and 29c. A magnet 31 shown in FIG. 14C is magnetized in the radial direction and has four pairs of magnetic poles 31a, 31b, 31c, and 31d in the peripheral direction. Thus, as the number of magnetic poles increase, the number of magnetic flux increases, and when the automatic balancing apparatus is rotated, the separation of the magnetic fluid from the magnets due to the centrifugal force can be suppressed. In addition, as the number of magnetic poles of a magnet increases, magnetic flux is equally generated around the magnets. Thus, since magnetic fluid equally clings to the magnets 28, 29, and 30, they are more smoothly moved. When the magnets are magnetized in the radial direction and have a plurality of pairs of magnetic poles in the peripheral direction, magnetic flux is equally generated in the peripheral direction, in particular, the magnets are smoothly moved in the peripheral direction. In particular, according to this embodiment, magnetic fluid can cling to outer peripheral surfaces 128, 129, and 131 of the magnets 28, 29, and 31, respectively.

Figure 15:
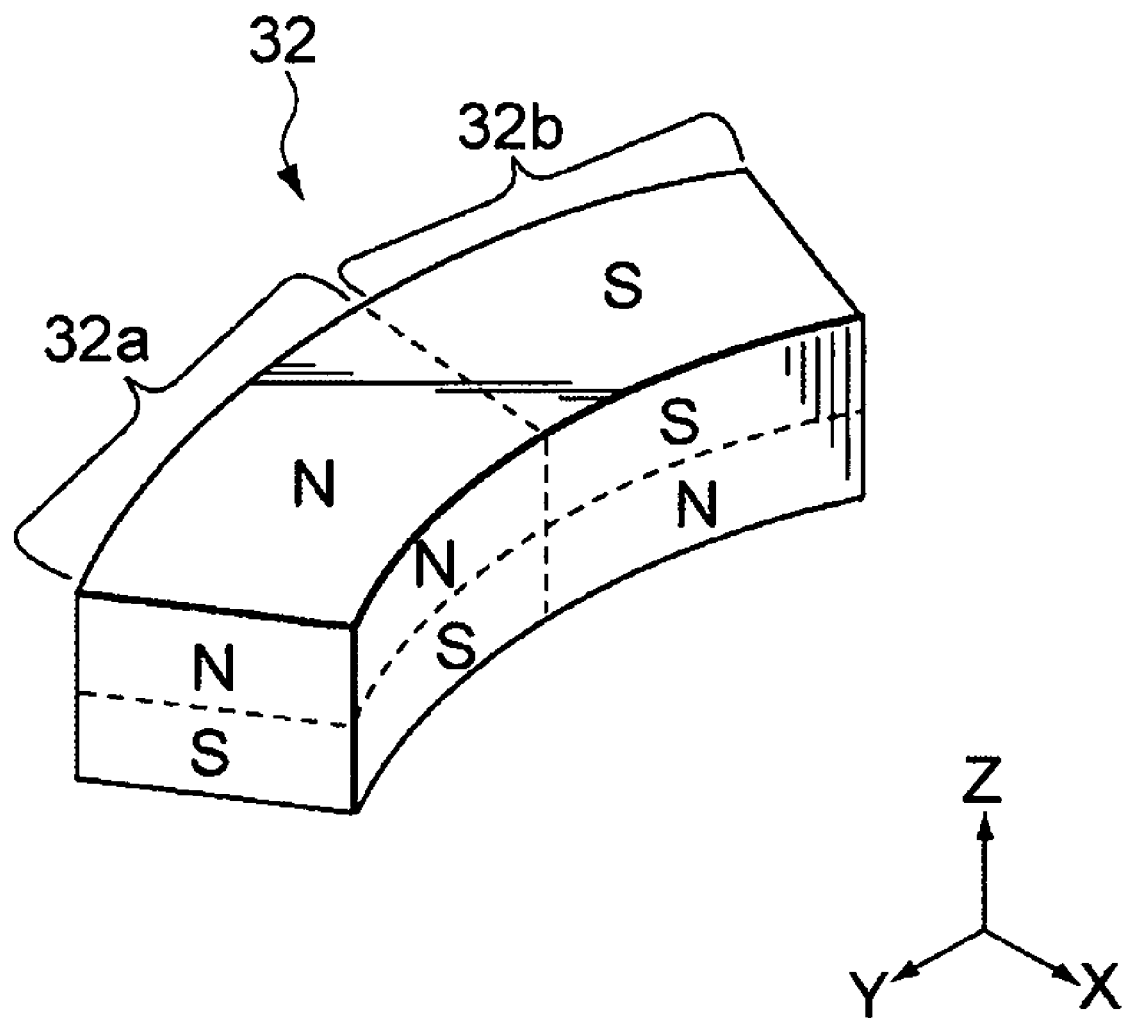
FIG. 15 is a perspective view showing a magnet having a plurality of pairs of magnetic poles like FIG. 14A, FIG. 14B, and FIG. 14C.

Of course, besides the magnetization in the radial direction, like a magnet 32 shown in FIG. 15, a magnet may be magnetized in the axial direction (Z direction) and has a plurality of pairs of magnetic poles 32a and 32b in the peripheral direction. In addition, the magnet 32 may have three or more pairs of magnetic poles instead of two pairs of magnetic poles. The structure can achieve the same effect as the magnets 28, 29, and 31 shown in FIG. 14A to FIG. 14C.

Figure 16:
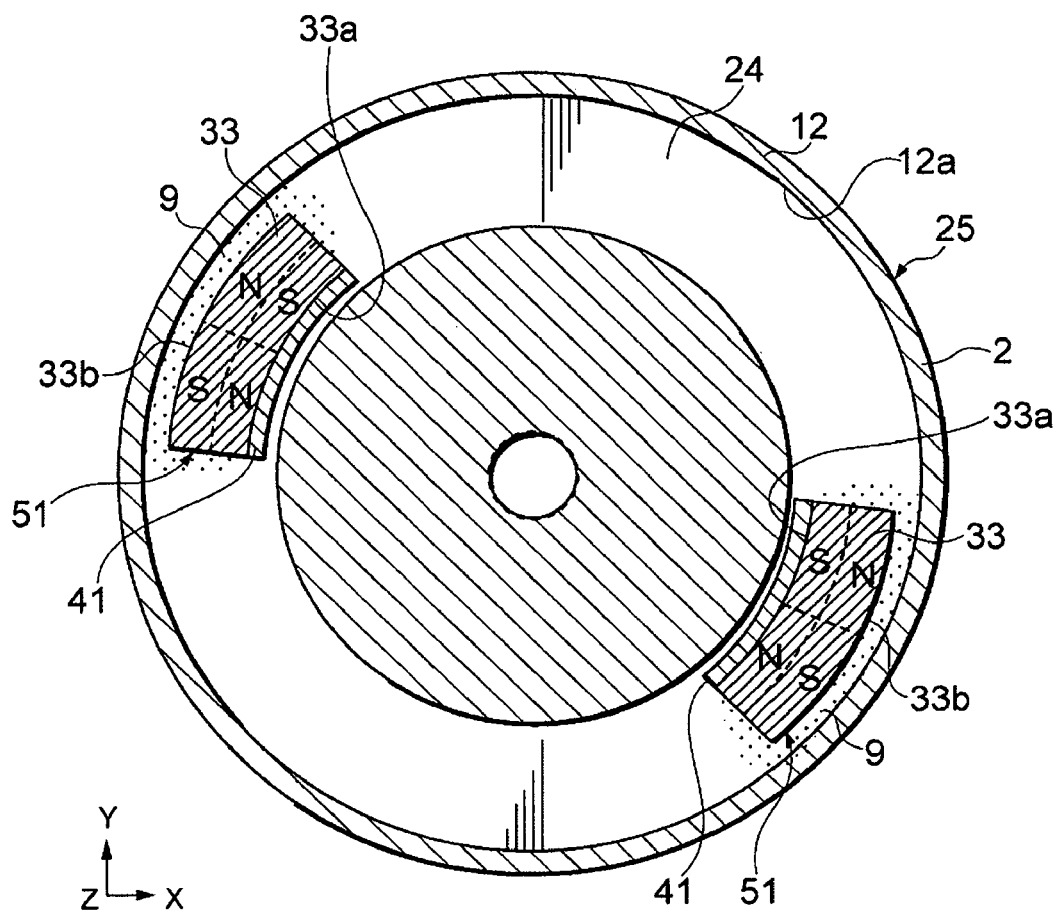
FIG. 16 is a sectional view showing an automatic balancing apparatus having magnets (balancers) with back yokes disposed on the inner periphery side.
Figure 17:
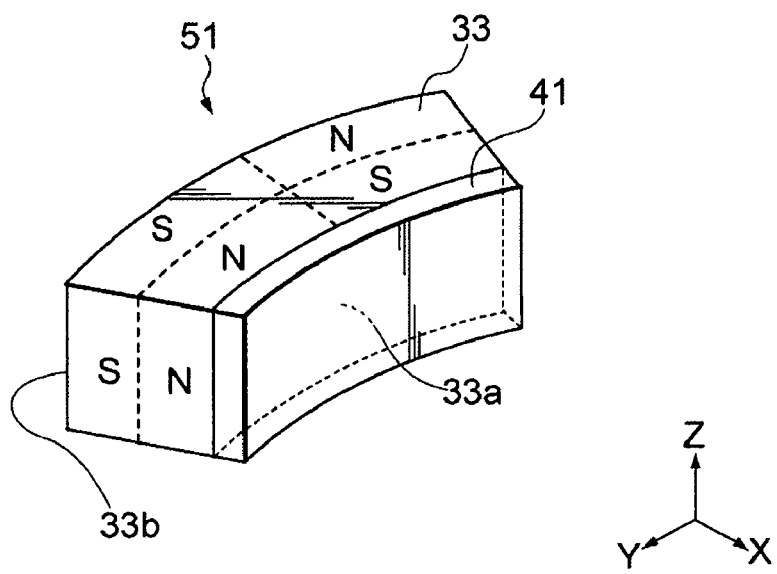
FIG. 17 is a perspective view showing the balancer shown in FIG. 16.

FIG. 16 is a sectional view showing an automatic balancing apparatus having magnets according to another embodiment of the present invention. A back yoke 41 is disposed so that it covers an inner peripheral surface 33a of a magnet 33. In this structure, a balancer 51 is formed. FIG. 17 is a perspective view showing the balancer 51. The material of the balancer 51 may be a commonly used magnetic material. Example of the connecting method of the magnet 33 and the back yoke 41 include adhering, cramping, welding, ultra sonic bonding, and laser bonding, but not limited thereto.

The back yoke 41 prevents magnetic flux of the magnet 33 from leaking into the inner periphery 33a side. Thus, magnetic flux can concentrate on the outer peripheral surface 33b of the magnet 33. As a result, when the housing 25 is rotated and the centrifugal force acts on the magnetic fluid 9, since a magnetic fluid film is formed on the outer periphery side of the balancer 51, the balancer 51 is smoothly moved while quietness is maintained. In other words, a problem of which the magnet 33 directly sticks to the outer peripheral wall surface 12a of the moving path 24, causing frictional force to increase and the magnet 33 not to be moved can be solved before the automatic balancing apparatus becomes the balanced state. In addition, since magnetic flux concentrates on the outer periphery side, the repulsive force of the magnets 33 weakens. As a result, the balancer 51 can be easily moved.

In FIG. 16 and FIG. 17, the magnetization direction and the number of pairs of magnetic poles of the magnet 33 are the same as those of the magnet 28 shown in FIG. 14A. Of course, the magnetization direction and the number of pairs of magnetic poles of the magnet 33 may be the same as those of the magnets shown in FIG. 14B and FIG. 14C. This applies to the magnetization direction and the number of pairs of magnetic poles of a magnet having a back yoke that will be described later.

Figure 18:
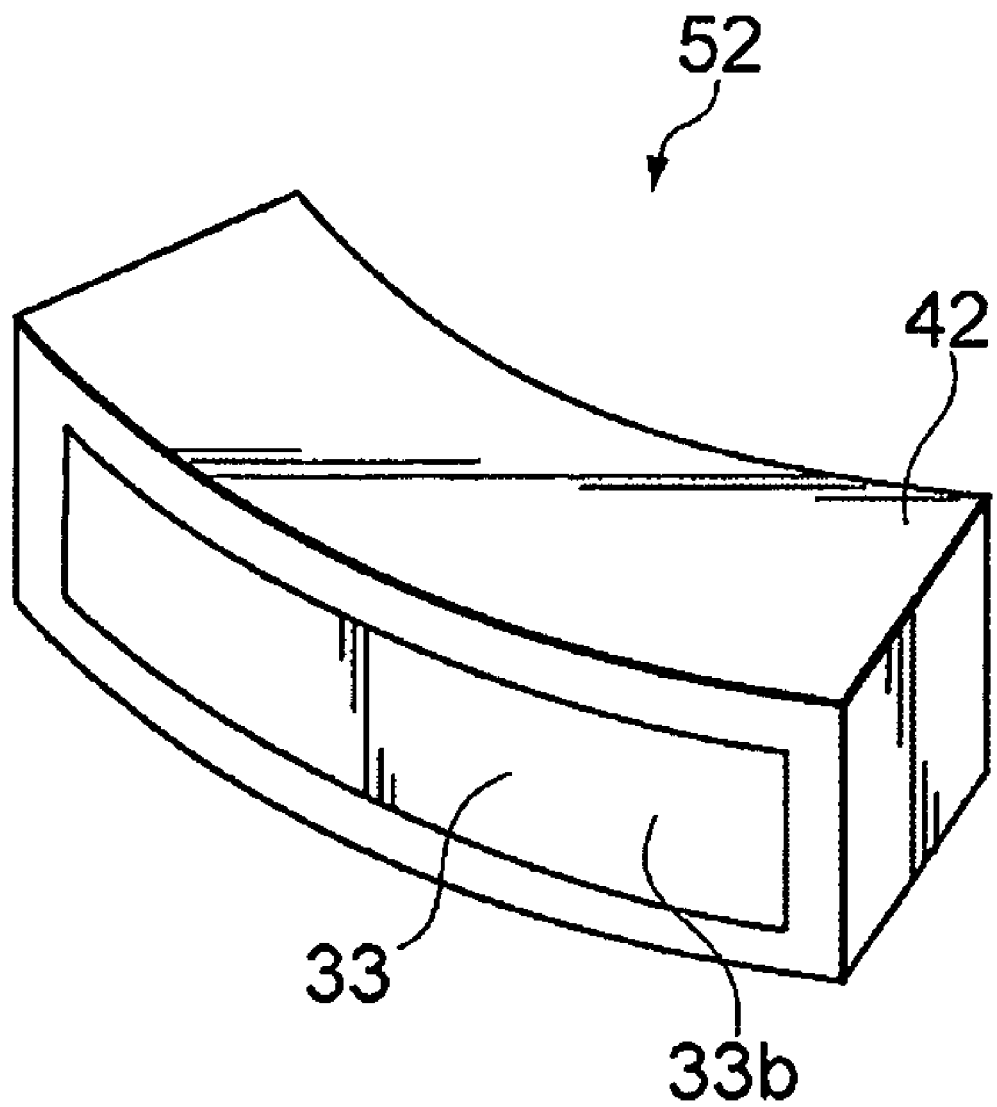
FIG. 18 is a perspective view showing a balancer having an magnet exposed on the outer peripheral surface.
Figure 19:
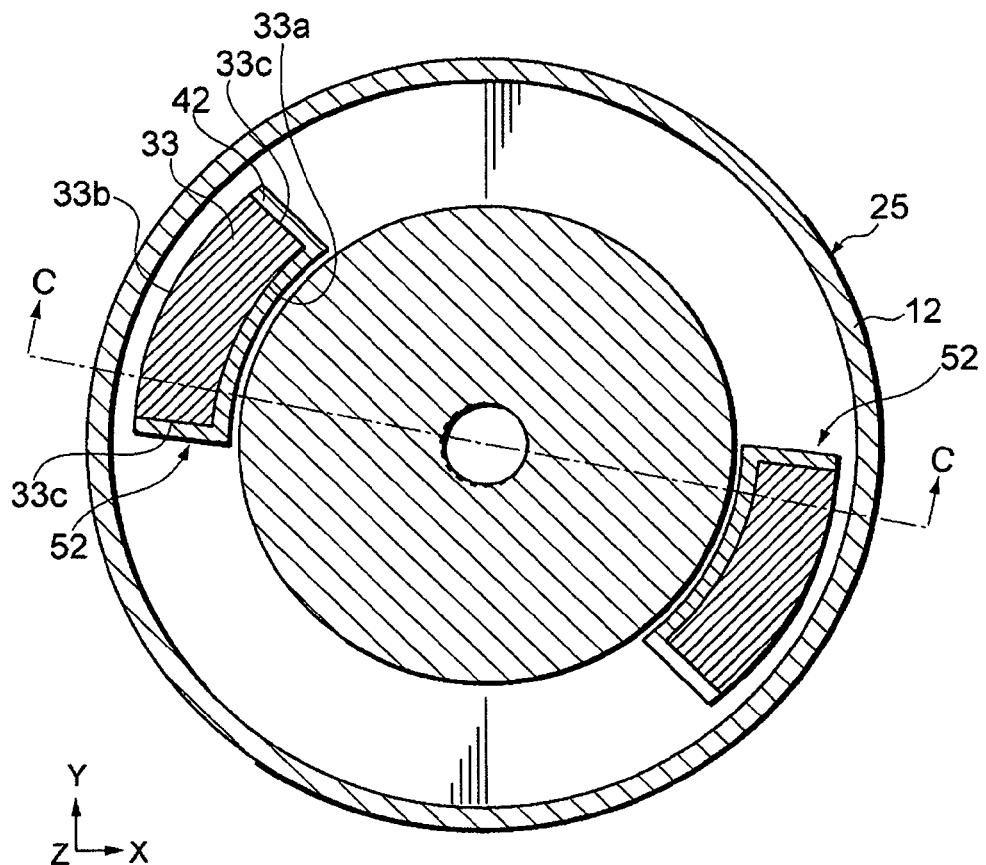
FIG. 19 is a sectional view showing an automatic balancing apparatus having the balancers shown in FIG. 18.
Figure 20:
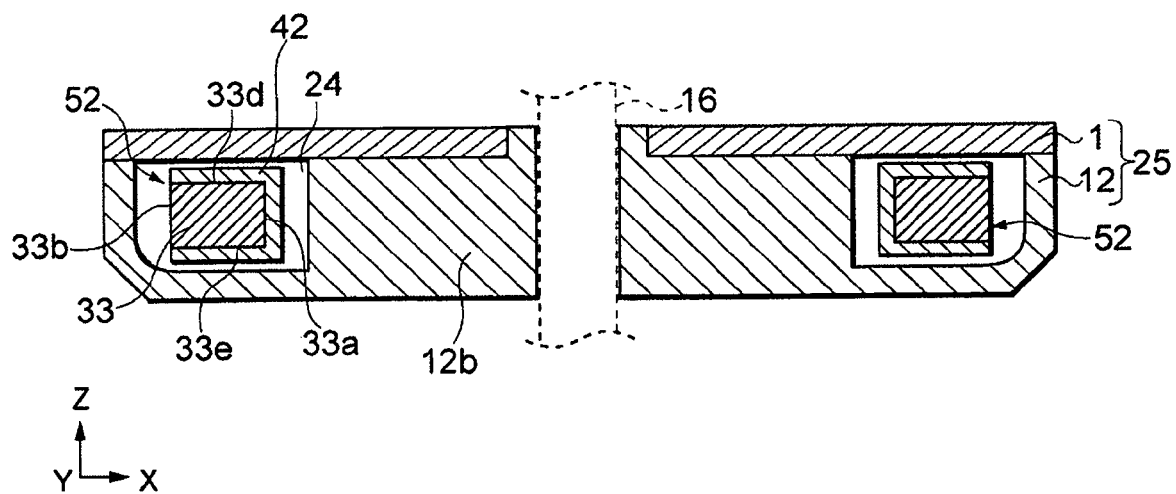
FIG. 20 is a sectional view taken along line C-C of FIG. 19.

FIG. 18 is a perspective view showing a balancer according to another embodiment of the present invention. FIG. 19 is a sectional view showing an automatic balancing apparatus having the balancers shown in FIG. 18. FIG. 20 is a sectional view taken along line C-C of FIG. 19. The balancer 52 has a back yoke 42. The back yoke 42 covers an inner peripheral surface 33a, an upper surface 33d, a bottom surface 33e, and both side surfaces 33c of a magnet 33. In other words, only an outer peripheral surface 33b of the magnet 33 is exposed. In this structure, magnetic flux more concentrates on the outer peripheral surface 33b. Thus, the balancer 52 can be smoothly moved.

Figure 21:
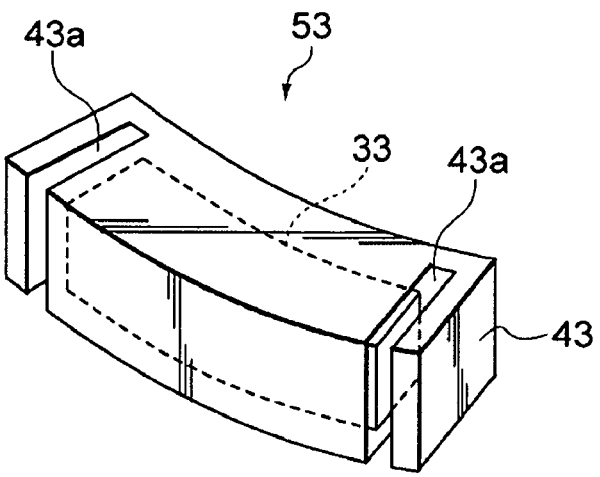
FIG. 21 is a perspective view showing a balancer having a magnetic gap on each outer periphery side.
Figure 22:
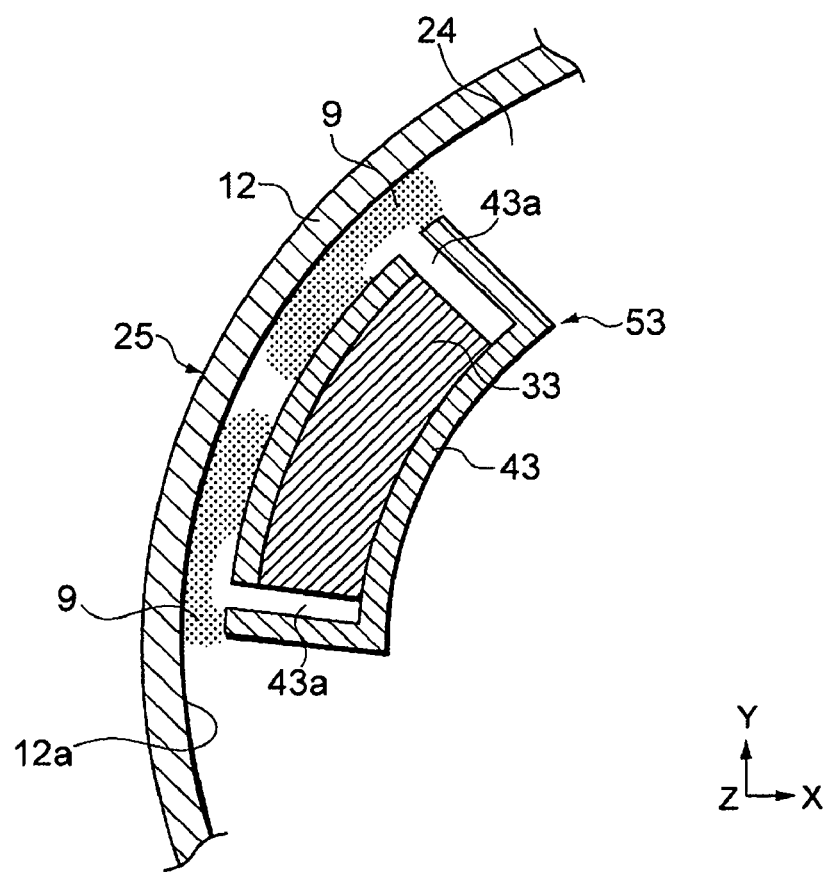
FIG. 22 is a sectional view showing a part of an automatic balancing apparatus having the balancer shown in FIG. 21.

FIG. 21 is a perspective view showing a balancer according to another embodiment of the present invention. FIG. 22 is a sectional view showing a part of an automatic balancing apparatus having the balancer shown in FIG. 21. The balancer 53 has a yoke 43. The yoke 43 has notches 43a on the outer periphery side. The notches 43a function as magnetic gaps, allowing magnetic flux to be effectively generated on the outer peripheral wall surface 12a. As shown in FIG. 22, magnetic fluid 9 concentrates between the outer peripheral surface 12a of the moving path 24 and the balancer 53. Thus, even if the centrifugal force that acts on the balancer 53 is large, the balancer 53 can be smoothly moved while quietness is maintained.

Figure 23:
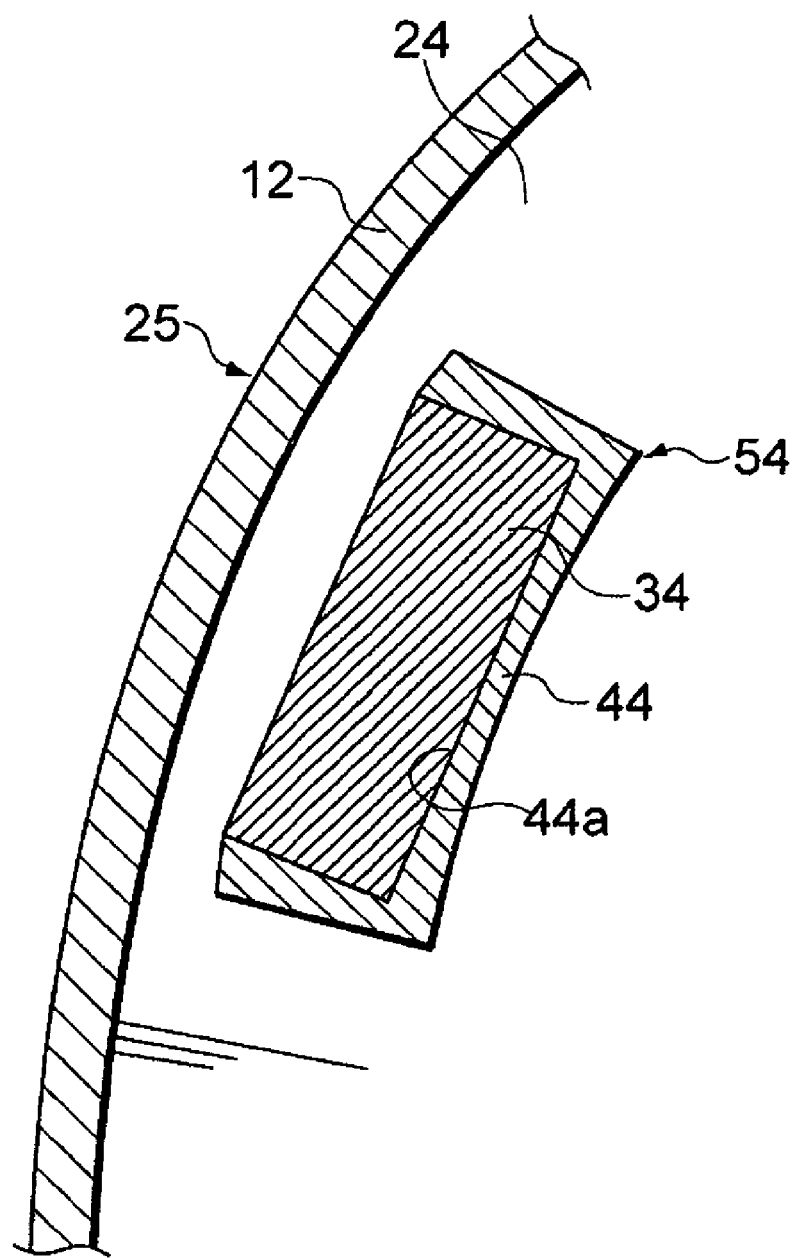
FIG. 23 is a sectional view showing a balancer of which a back yoke is mounted on a magnet formed in a rectangular parallelepiped shape.
Figure 24:
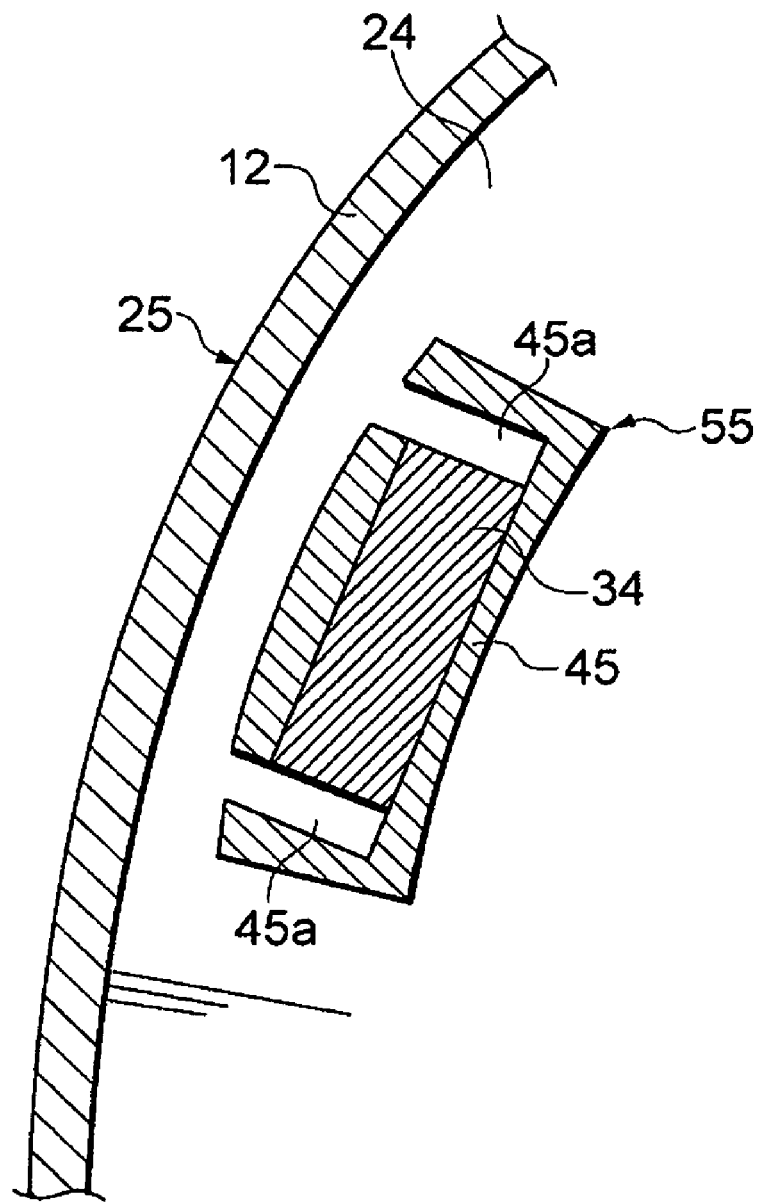
FIG. 24 is a sectional view showing a balancer having a yoke with magnetic gaps and a magnet formed in a rectangular parallelepiped shape.
Figure 25:
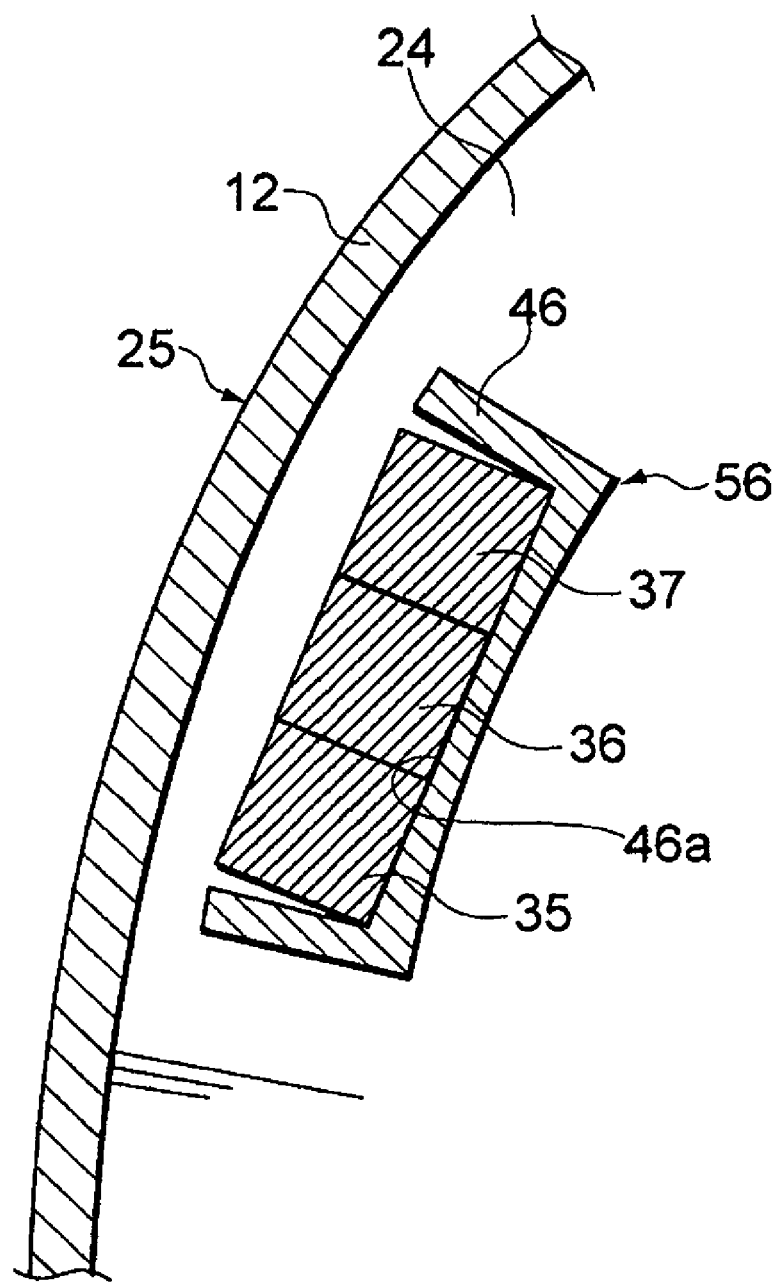
FIG. 25 is a sectional view showing a balancer having a yoke with for example three magnets.

FIG. 23, FIG. 24, and FIG. 25 are sectional views showing balancers according to another embodiment of the present invention. A balancer 54 has a magnet 34 formed in a rectangular parallelepiped shape, not an arc shape block. A yoke 44 has an inner surface 44a formed in a rectangular parallelepiped shape corresponding to the shape of the magnet 34. The yoke 44 has an outer surface formed in an arc block shape. Thus, it is not necessary to form the magnet 34 in a particular shape, for example an arc block shape. Thus, it is necessary to form only the yoke 44 in a particular shape, as a result, the magnet can be easily machined and manufactured.

This structure also applies to embodiments shown in FIG. 16 to FIG. 22. With this yoke 44, even if the outer shape of a balancer is complicated, it can be easily manufactured as a merit of this embodiment.

A balancer 55 shown in FIG. 24 has a yoke 45. The yoke 45 has notches 45a on the outer periphery sides as shown in FIG. 21. A magnet 34 formed in the foregoing rectangular parallelepiped shape is disposed in the yoke 45. In this structure, magnetic flux can be effectively generated. In addition, the magnet can be easily machined and manufactured.

A balancer 55 shown in FIG. 25 has a yoke 46. For example three magnets 35, 36, and 37 are disposed in the yoke 46. The magnets 35, 36, and 37 are secured on the inner surface of the yoke 46. Like so, a plurality of magnets may be disposed in the yoke 46.

The yokes shown in FIG. 16 to FIG. 25 are formed in an arc shape. Instead, the yokes may be formed in a angularly cylindrical shape, a circular cylindrical shape, or another shape.

The number of magnetic gaps 43a shown in FIG. 21 and FIG. 24 is not limited to two. The number of magnetic gaps may be changed depending on for example the number of pairs of magnetic poles of the magnet 33.

Figure 26A:
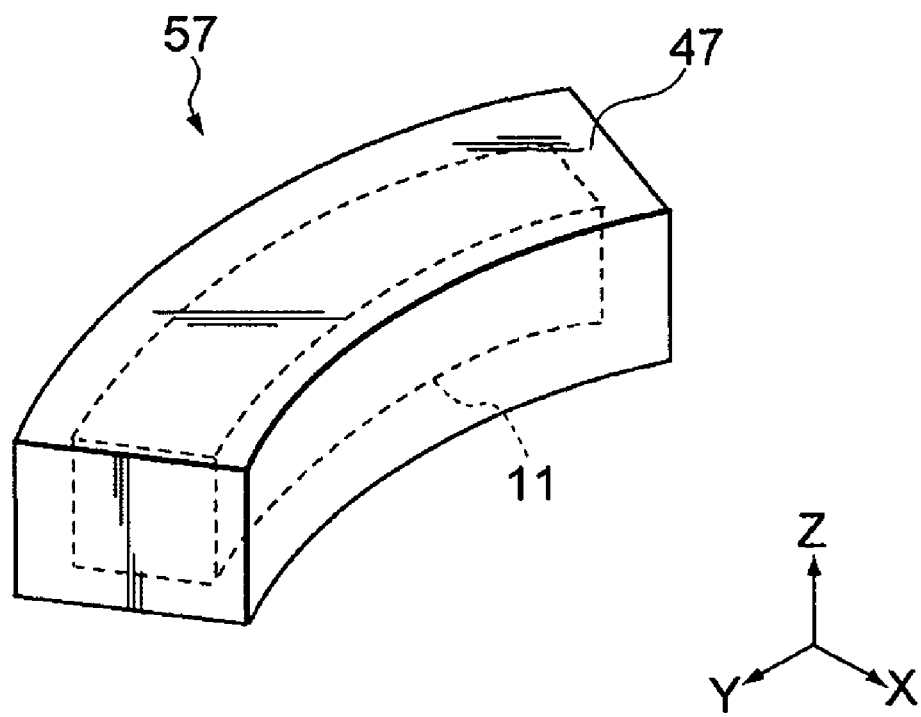
FIG. 26A and FIG. 26B are a perspective view and a sectional view showing a balancer having a magnet coated with a resin member.
Figure 26B:
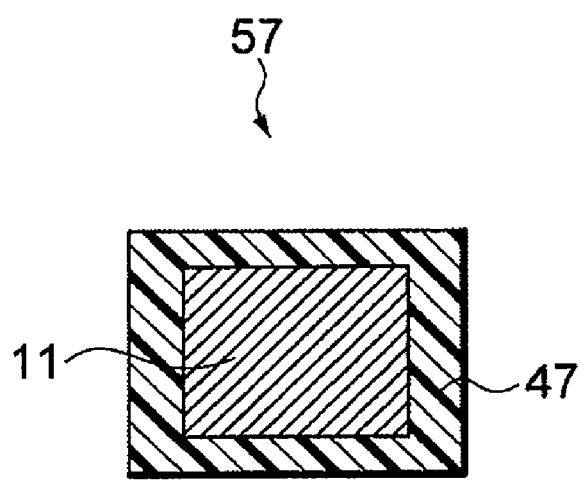

FIG. 26A is a perspective view showing a balancer according to another embodiment of the present invention. FIG. 26B is a sectional view showing the balancer. The balancer 57 has a magnet 11 formed in the foregoing arc block shape. The magnet 11 is coated with a resin member 47. Thus, even if the outer shape of the balancer 57 is complicated, it can be easily manufactured. In addition, the magnet 11 coated with the resin member 47 contacts magnetic fluid in a low frictional state, namely with a low frictional coefficient. As a result, the balancer 57 can be smoothly moved.

Examples of the connecting method of the magnet 11 and the resin member 47 include bonding, clamping, welding, ultrasonic bonding, and laser bonding, but not limited thereto.

Figure 27A:
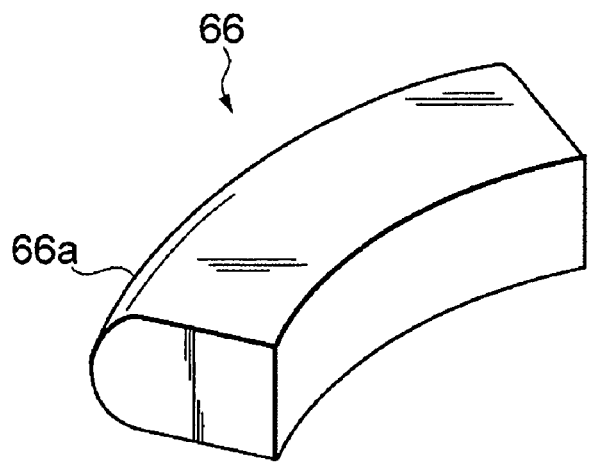
FIG. 27A, FIG. 27B, and FIG. 27C are perspective views showing other magnets according to another embodiment of the present invention.
Figure 27B:
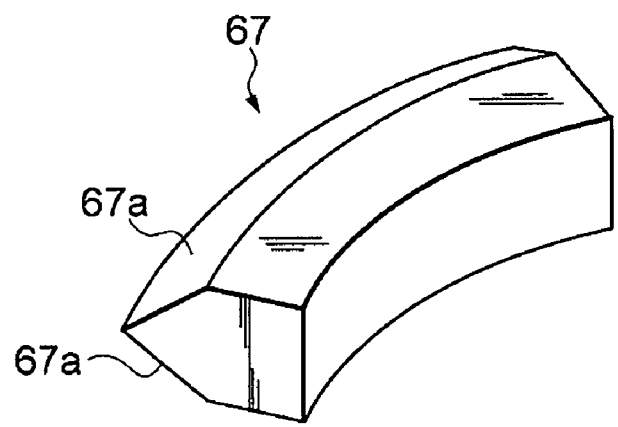
Figure 27C:
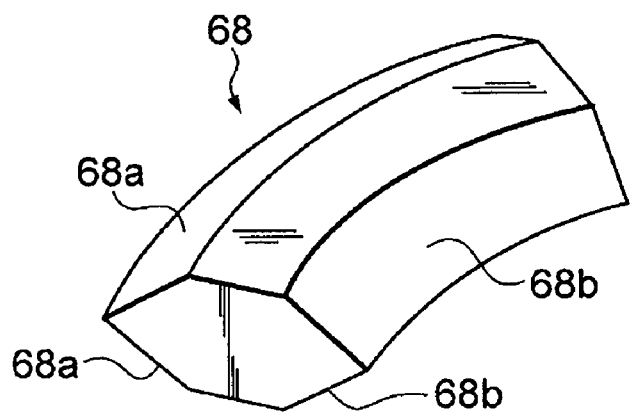

FIG. 27A to FIG. 27C are perspective views showing magnets according to another embodiment of the present invention.

Figure 28:
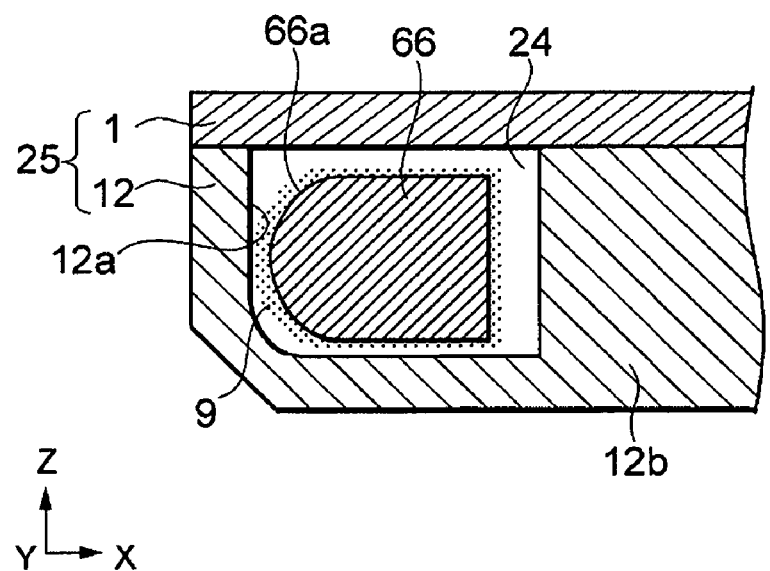
FIG. 28 is a sectional view showing a part of an automatic balancing apparatus of which the magnet shown in FIG. 27A is disposed in a moving path of a housing.

A magnet 66 shown in FIG. 27A has an outer peripheral surface 66a that is curved. FIG. 28 is a sectional view showing a part of an automatic balancing apparatus of which the magnet 66 is disposed in a moving path 24 of a housing 25. Since the outer peripheral surface 66a is curved, as shown in FIG. 28, the contact area of the outer peripheral surface 66a and an outer peripheral wall surface 12a of the moving path 24 becomes small. Thus, since the frictional coefficient of the outer peripheral portion of the magnet 66 decreases, after the peripheral surface 66a contacts the outer peripheral wall surface 12a due to the centrifugal force, the magnet 66 can be moved until the automatic balancing apparatus becomes the balanced state. In addition, a situation of which surface tension of magnetic fluid causes the magnet 66 to stick on the outer peripheral wall surface 12a and frictional resistance increases can be prevented.

A magnet 67 shown in FIG. 27B has a taper surface 67a formed in such a manner that the width in the direction of the rotational axis (Z direction) gradually decreases outwardly. This structure can achieve the same effect as the structure shown in FIG. 27A. A magnet shown in FIG. 27C has not only a taper surface 68a on the outer periphery but also a taper surface 68b on the inner periphery.

Figure 29:
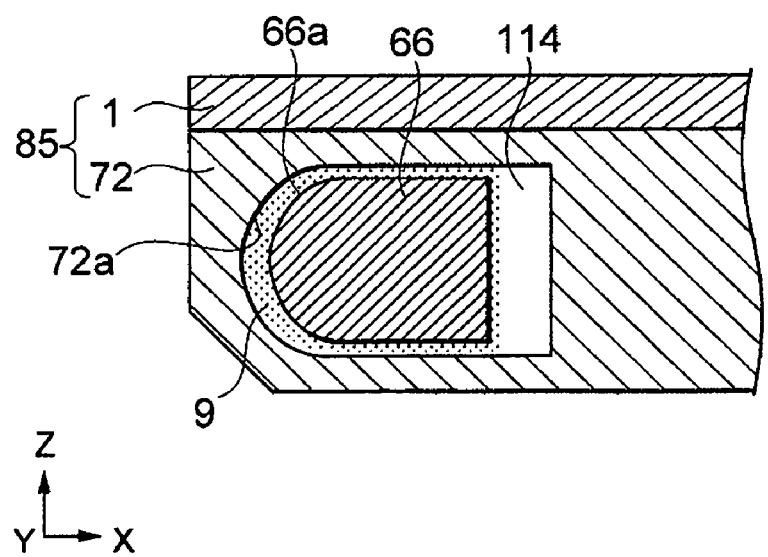
FIG. 29 is a sectional view showing a housing having a moving path whose outer peripheral wall surface is curved.

When the magnet 66 shown in FIG. 27A is used, an outer peripheral wall surface 72a of a moving path 114 formed in a case 72 shown in FIG. 29 may be curved. In this structure, when a housing 85 is rotated, as long as a film of magnetic fluid 9 is sufficiently formed on the outer peripheral wall surface 72a, the magnet 66 can be smoothly moved.

The magnets 66, 67, and 68 shown in FIG. 27A to FIG. 27C may be disposed in yokes according to the foregoing embodiments. Instead, as shown in FIG. 26, the magnets 66, 67, and 68 may be coated with a resin member.

Figure 30A:
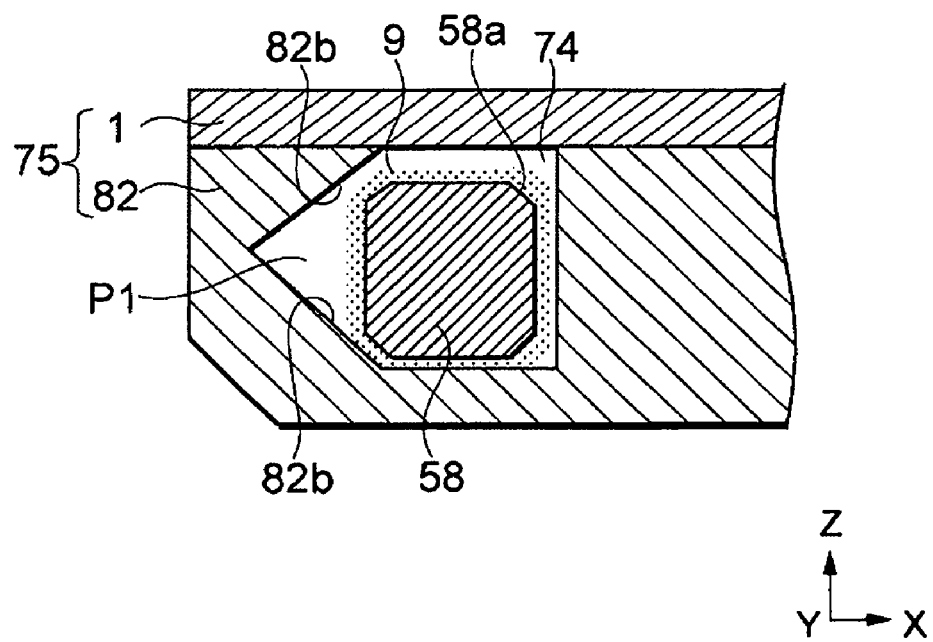
FIG. 30A and FIG. 30B are sectional view showing a moving path formed in a housing according to another embodiment of the present invention.

FIG. 30A is a sectional view showing a moving path formed in a hosing according to another embodiment of the present invention. A moving path 74 formed in a case 82 that constitutes a housing 75 has an outer peripheral wall surface that is a taper wall surface 82b. The taper wall surface 82b is formed in such a manner that the width in the direction of the rotational axis of the moving path 74 gradually decreases outwardly.

Figure 30B:
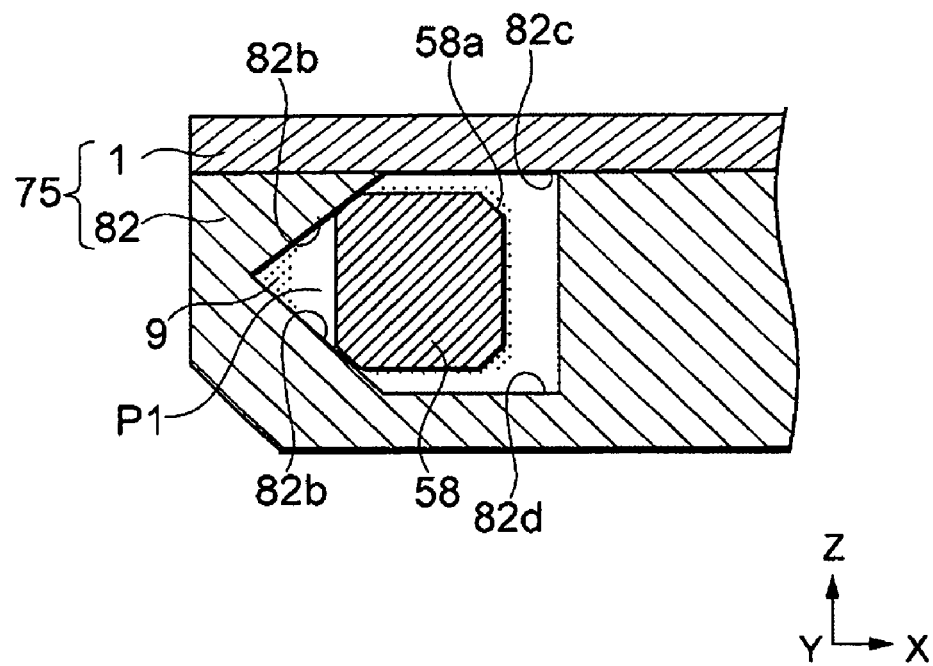

In the automatic balancing apparatus, when the housing 75 is rotated and centrifugal force acts on a magnet 58, as shown in FIG. 30B, the magnet 58 is moved on the outer periphery side. Although the magnet 58 contacts the taper wall surface 82b of the moving path 74, since a space P1 is formed between the upper and lower taper wall surfaces 82b and the magnet 58, air can pass through the space P1. Unless the taper wall surface 82b is formed, the magnet 58 may stick on the outer periphery side due to the pressure difference between the inner periphery side and the outer periphery side of the moving path. As a result, since the frictional coefficient that acts on the magnet 58 becomes too high, the magnet 58 may not be moved. However, since the space P1 is formed, air passes through the space P1, suppressing the pressure difference and thereby decreasing the frictional coefficient. Thus, the magnet 58 can be moved until the automatic balancing apparatus becomes the balanced state.

In addition, when the housing 75 is rotated, since the magnetic fluid 9 escapes to the space P1, the magnet 58 is released from the viscosity resistance of the magnetic fluid 9. Thus, the magnet 58 can be easily moved. In addition, since the centrifugal force causes the magnet 58 to ride on the taper wall surface 82b, the magnet 58 does not contact the upper wall surface 82c or the lower wall surface 82d of the moving path 74. In other words, since the magnet 58 floats in the moving path 74, the magnet 58 can be easily moved as an effect of this embodiment.

However, if there is a vertical outer peripheral wall surface without the taper wall surface 82b and the viscosity of the magnetic fluid 9 is low, after the centrifugal force causes the magnet 58 to contact the vertical wall surface, the magnet 58 may continuously slide. In contrast, the space P1 may be used as an escape path for the magnetic fluid 9. When there is the escape path, the centrifugal force causes the magnetic fluid 9 to enter the escape path, causing the magnet 58 to contact the taper wall surface 82b and stop against the housing.

The magnet 58 shown in FIG. 30A and FIG. 30B has taper surfaces 58a at corners. These taper surfaces 58a are not intentionally formed in a manufacturing process. Instead, the taper surfaces 58a may be intentionally formed.

Figure 31:
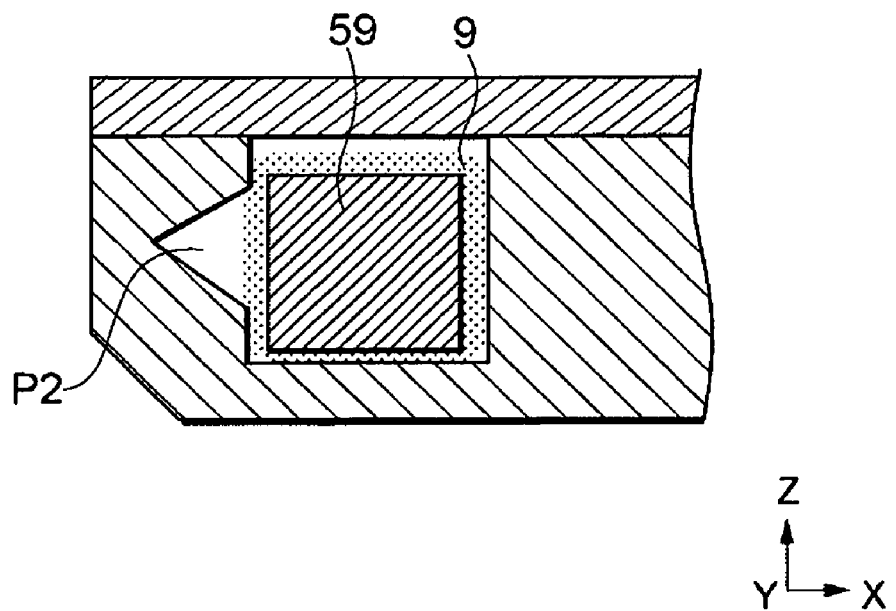
FIG. 31 is a sectional view showing a modification of a space formed between the magnet shown in FIG. 30 and the outer peripheral wall surface.
Figure 32:
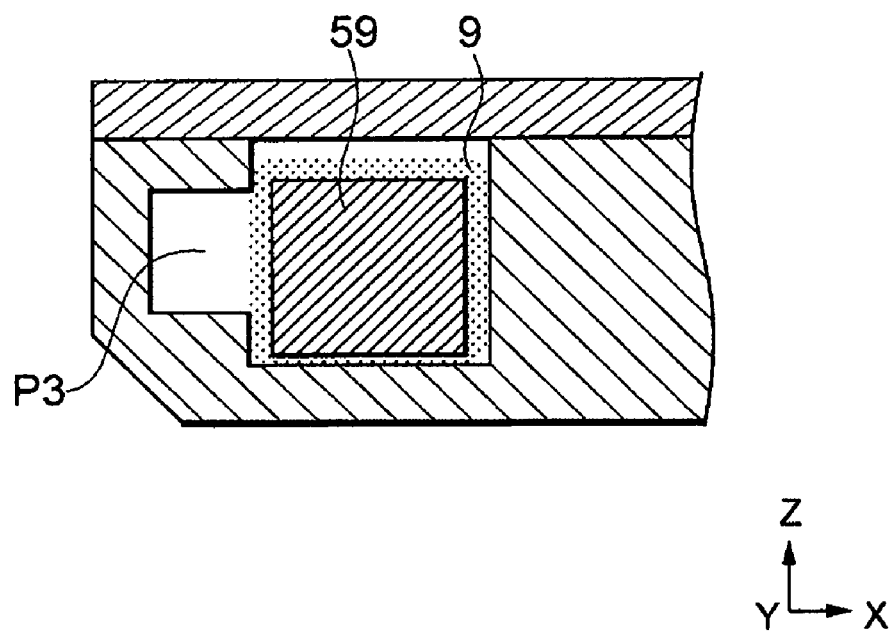
FIG. 32 is a sectional view showing another modification of a space formed between the magnet shown in FIG. 30 and the outer peripheral wall surface.

FIG. 31 and FIG. 32 are sectional views showing modifications of the space P1. A space P2 shown in FIG. 31 is different from the triangular space P1 in volume (the size of the area of the section). A space P3 shown in FIG. 32 has a rectangular section. The width in the Z direction of each of the spaces P2 and P3 is smaller than the width in the Z direction of the magnet 59. In these structures, the spaces P2 and P3 can be used as an air path or an escape path for the magnetic fluid 9.

Figure 33:
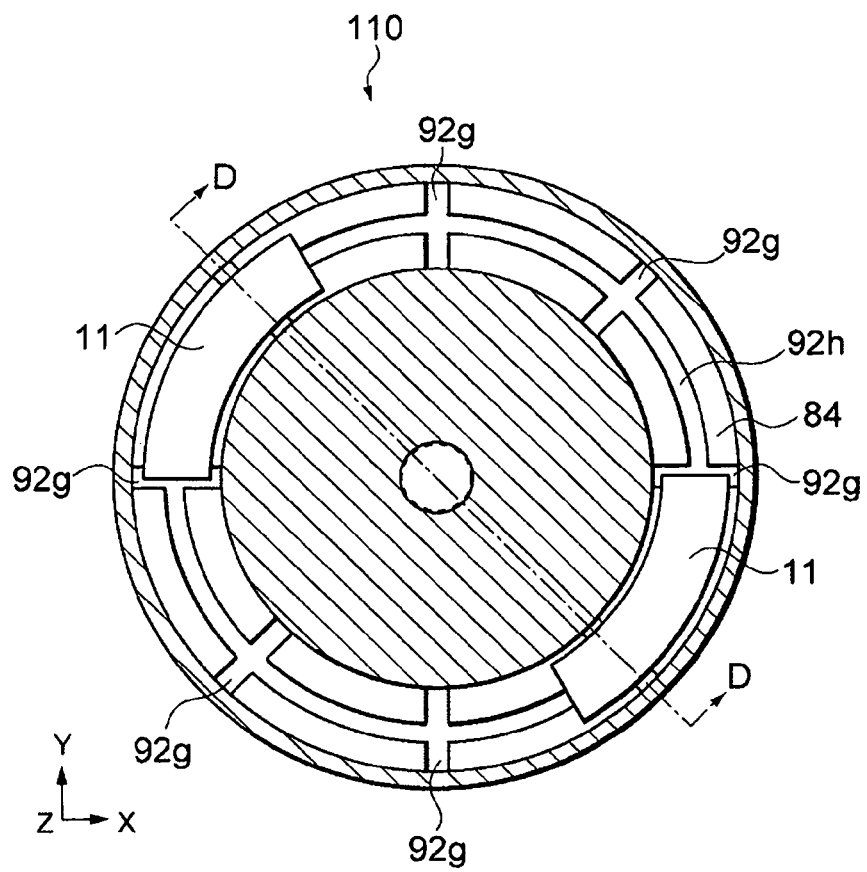
FIG. 33 is a sectional view showing an automatic balancing apparatus having a moving path in which an air path is formed.
Figure 34:
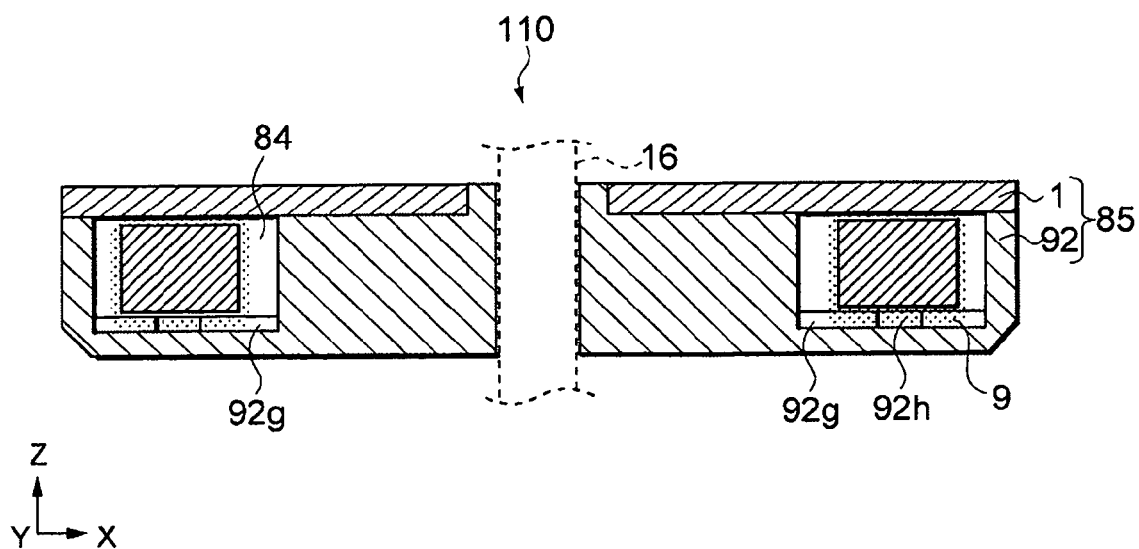
FIG. 34 is a sectional view taken along line D-D of FIG. 33.

FIG. 33 is a sectional view showing an automatic balancing apparatus according to another embodiment of the present invention. FIG. 34 is a sectional view taken along line D-D of FIG. 33. An automatic balancing apparatus 110 has an air path 92g formed on a path surface of a moving path 84. The air path 92g extends in the radial direction. Unless the air path 92g is formed, when the centrifugal force causes the magnet 11 to move on the outer periphery side, since the inner periphery side of the moving path 84 tends to be subject to a negative pressure, the magnet may be prevented from being smoothly moved. However, according to this embodiment, when the centrifugal force causes the magnet 11 to move on the outer periphery side, since the air path 92g is formed, there is no pressure difference between the inner periphery side and the outer periphery side of the moving path 84. Thus, the magnet can be smoothly moved.

Instead, the air path 92g may extend diagonally from the inner periphery side to the outer periphery side shown in FIG. 33. Instead, an air path 92h may be formed in the peripheral direction of the moving path 84.

Figure 35:
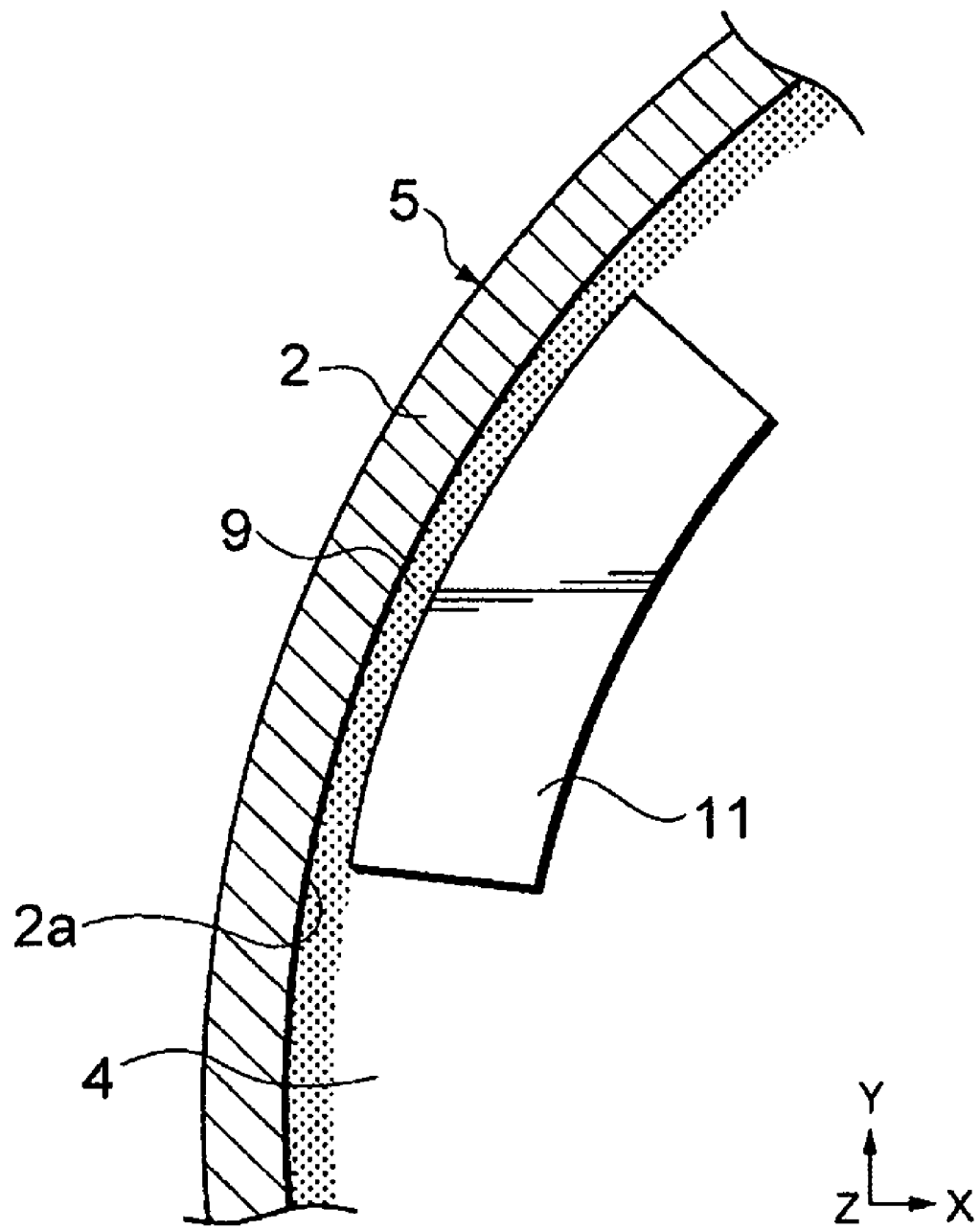
FIG. 35 is a sectional view showing a part of an automatic balancing apparatus in which a magnetic fluid film is formed on the entire periphery of an outer peripheral wall surface.

FIG. 35 shows an example of the operation of an automatic balancing apparatus according to another embodiment of the present invention. In this example, the magnetic fluid 9 is supplied for an amount that allows the centrifugal force upon rotation of the housing 5 to cause the magnetic fluid 9 to flow on the outer periphery side and a film thereof to be formed on the entire periphery of the outer peripheral surface 2a of the moving path 4. When a film of the magnetic fluid is formed on the entire periphery of the outer peripheral surface 2a upon rotation of the housing 5, the magnet 11 can be smoothly moved. Since the magnetic fluid 9 pressed by the magnet 11 due to the centrifugal force that takes place upon rotation of the housing 5 is also subject to the pressure of the adjacent magnetic fluid film, the magnetic fluid is regularly present on the outer periphery side of the magnet 11. Thus, the magnetic fluid film allows the friction on the outer periphery side to decrease.

Instead, the magnetic fluid 9 may be supplied for an amount that allows the film thickness in the radial direction of the magnetic fluid at a portion pressed by the magnet 11 due to the centrifugal force upon rotation of the housing 5 to be nearly the same as the film thickness in the radial direction of the magnetic fluid at a portion not pressed by the magnet 11. Since the magnetic fluid 9 gathers in the direction of which the magnet 11 is finally moved, it is thought that the film thickness of the magnetic fluid 9 that gathers is greater than the film thickness of the magnetic fluid 9 that does not gather. In this case, the magnetic fluid 9 is supplied for an amount that allows the thick film portion to be pressed by the magnet 11 due to the centrifugal force and the film thickness to be equal on the entire periphery of the outer peripheral wall surface 2a. Thus, the magnetic fluid film can be prevented from being pressed and lost by the magnet 11 due to the centrifugal force.

Figure 36:
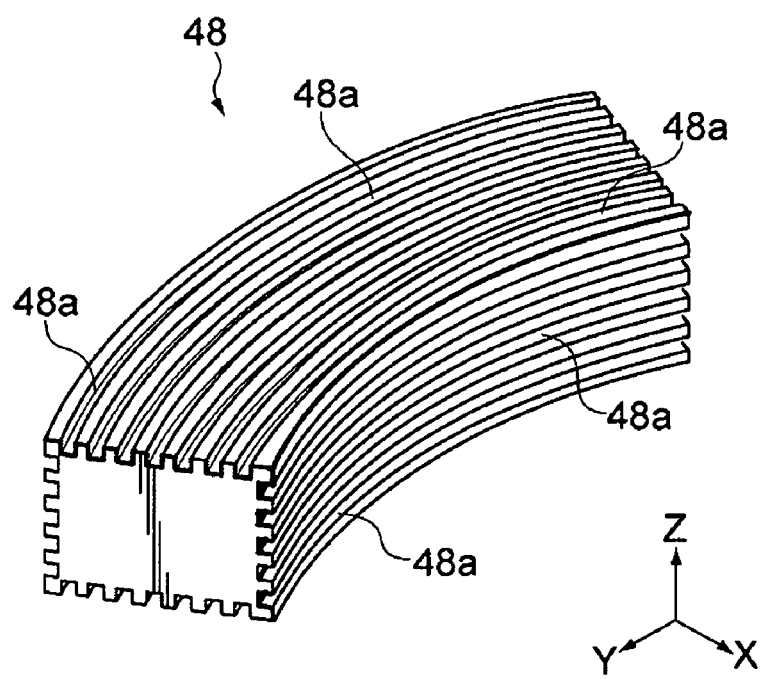
FIG. 36 is a perspective view showing a magnet on which a plurality of grooves are formed.
Figure 37:
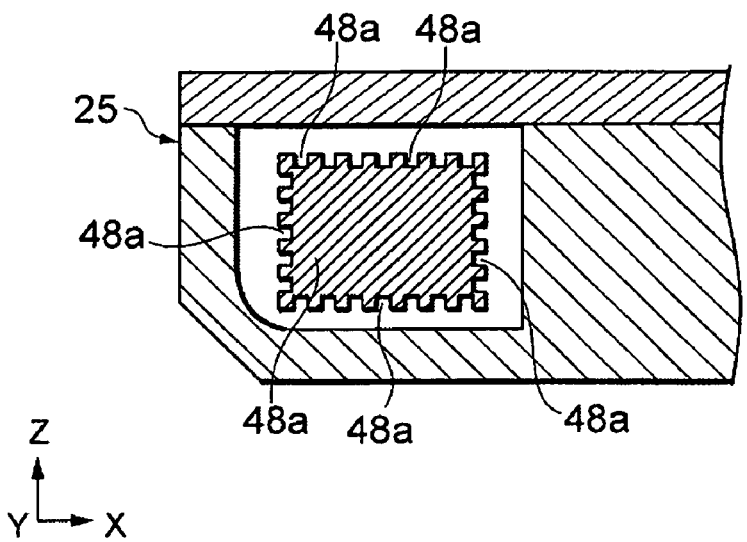
FIG. 37 is a sectional view showing the state that the magnet shown in FIG. 36 is disposed in a housing.

FIG. 36 is a perspective view showing a magnet according to another embodiment of the present invention. FIG. 37 is a sectional view showing a state that the magnet shown in FIG. 36 is disposed in a housing 25. A plurality of grooves (depressed and raised portions) 48a are formed on the front surface of a magnet 48. The grooves 48a are formed so that they extend in the peripheral direction. Unless the grooves 48a are formed, the surface tension of the magnetic fluid 9 causes the magnet 48 to stick on the surface of the moving path 14. Thus, the frictional coefficient increases. According to this embodiment, such a problem can be solved. The grooves 48a may be formed in the radial direction or a diagonal direction other than the peripheral direction.

Figure 38:
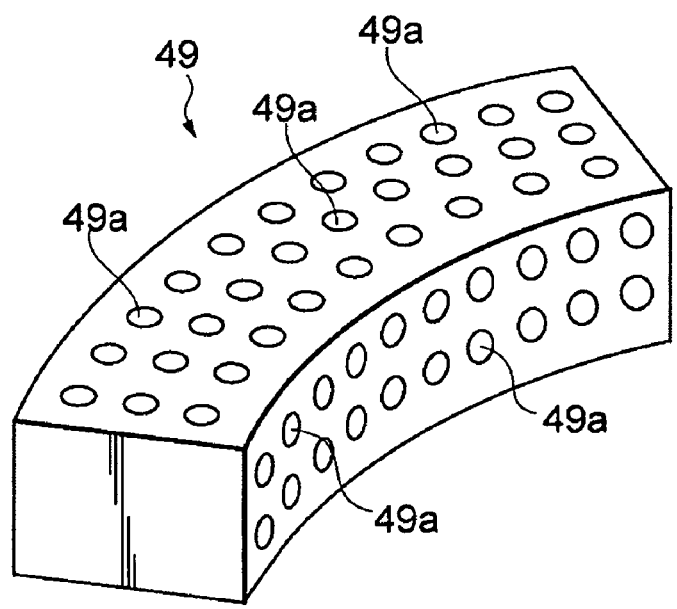
FIG. 38 is a perspective view showing a magnet having a plurality of holes formed on the front surface.
Figure 39:
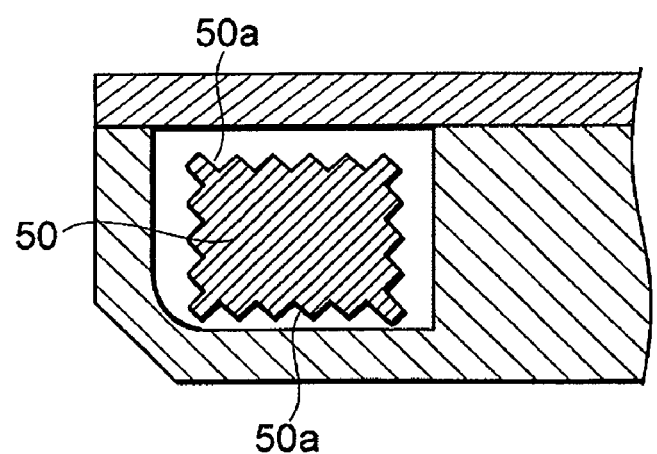
FIG. 39 is a schematic diagram showing a magnet having triangular depressed and raised grooves formed on the front surface.

A plurality of holes 49a are formed on the front surface of a magnet 49 shown in FIG. 38. The holes 49a are not through-hole, but depressed and raised portions. In other words, it may be thought that "the plurality of holes" is included in a concept of "depressed portions" of "depressed and raised portions". Likewise, it may be thought that the grooves 48a shown in FIG. 36 are included in a concept of "depressed portions" of "depressed and raised portions". The depressed and raised portions may include various modes. For example, like a magnet 50 shown in FIG. 39, depressed and raised portions 50a having a triangular section may be formed. Instead, the front surface of the magnet may have predetermined surface roughness.

Figure 40:
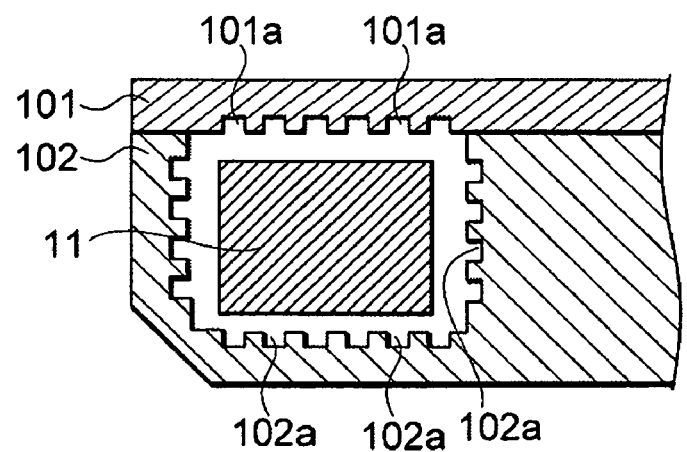
FIG. 40 is a sectional view showing a housing having grooves formed in a moving path.

Instead, as shown in FIG. 40, when grooves (depressed portions or holes) 102a are formed in a case 102 that constitutes a housing, the same effect can be achieved. Likewise, grooves (depressed portions or holes) 101a may be formed in a cover 101.

The foregoing grooves or depressed and raised portions may be formed in the yokes and resin members shown in FIG. 16 to FIG. 26. The front surfaces of the yokes and resin members may have predetermined surface roughness. These grooves, depressed and raised portions, and so forth are included in a concept of "air path" shown in for example FIG. 33 and FIG. 34.

Figure 41:
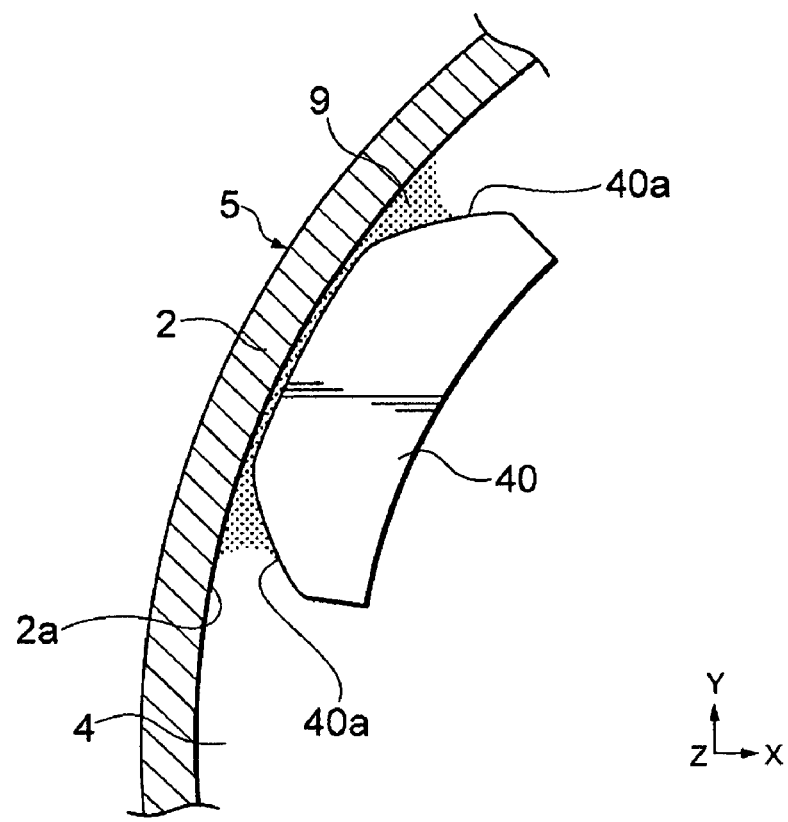
FIG. 41 is a sectional view showing a magnet having a tapered or curved surface formed on the outer periphery.

FIG. 41 is a sectional view showing a part of an automatic balancing apparatus according to another embodiment of the present invention. In this embodiment, a magnet 40 is formed so that the distance between the magnet 40 and an outer peripheral wall surface 2a of a moving path 4 gradually decreases proportional to the distance between the edge portion of the magnet 50 and the center position thereof in the peripheral direction of the rotation. In other words, a taper surface or a curved surface 40a is formed on the outer periphery of the magnet 40. Thus, the surface tension of the magnetic fluid 9 causes the magnetic fluid 9 to enter the space between the taper surface or the curved surface 40a and the outer peripheral wall surface 2a in the peripheral direction. The magnetic fluid 9 has a wedge effect for the magnet 40 as if the magnetic fluid 9 peeled the magnet 40 from the outer peripheral wall surface 2a. As a result, the frictional resistance that acts on the magnet 40 decreases.

Such a wedge effect can be achieved by the magnets 66, 67, and 68 shown in FIG. 27A to FIG. 27C. In the case of the magnets 66, 67, and 68, as shown in FIG. 28, the magnetic fluid 9 enters the space between the magnet 66 and the outer peripheral wall surface 12a from the top and bottom of the magnet 66.

Figure 42:
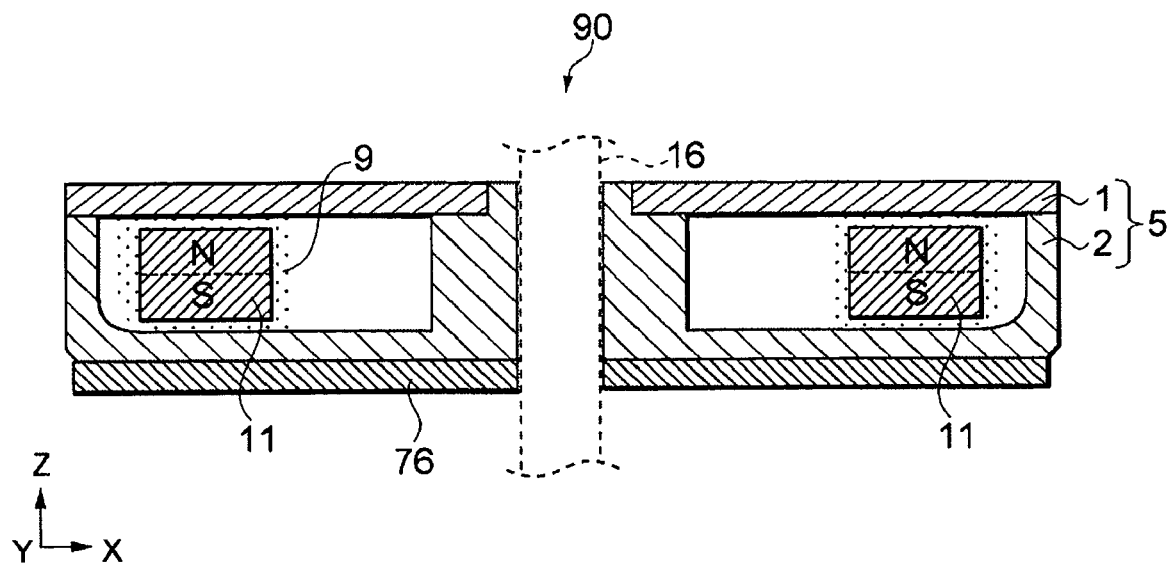
FIG. 42 is a sectional view showing an automatic balancing apparatus having an attenuation member.
Figure 43:
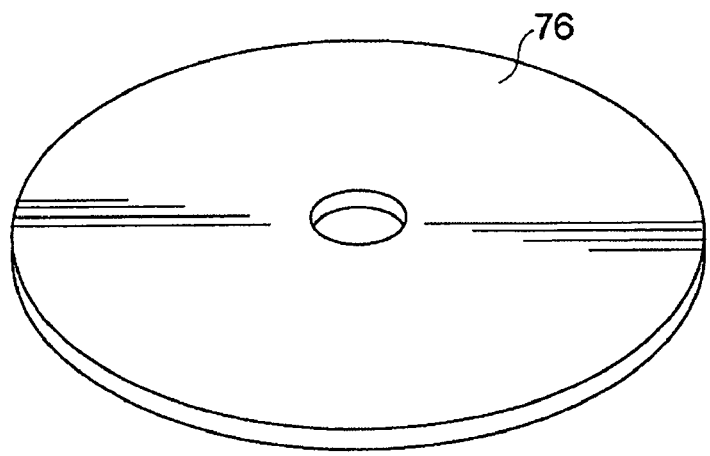
FIG. 43 is a perspective view showing the attenuation member shown in FIG. 42.

FIG. 42 is a sectional view showing an automatic balancing apparatus according to another embodiment of the present invention. The automatic balancing apparatus 90 has for example the housing 5 of the automatic balancing apparatus 10 shown in FIG. 3. An attenuation member 76 that attenuates the moving force of the magnet 11 is disposed at a bottom portion of the housing 5. FIG. 43 is a perspective view showing the attenuation member 76. The "moving force" means centrifugal force or the like that acts on the magnet 11 upon rotation of the housing 5. The attenuation member 76 is made of for example a non-magnetic substance. Specifically, the attenuation member 76 is made of aluminum, stainless steel, or an alloy containing for example aluminum. In this case, the housing 5 is made of for example resin or ceramic member of resin, aluminum alloy, bronze alloy, ceramic, or the like.

When the housing 5 is rotated, the centrifugal force acts on the magnet 11. When the magnet 11 is moved, a magnetic field is generated. When the attenuation member 76 is subject to the magnetic field, an eddy current occurs. To effectively generate an eddy current, when the attenuation member 76 is disposed at the bottom of the housing 5, it is preferred that the magnet 11 be magnetized in the direction of the rotational axis, namely the attenuation member 76 be aligned with the magnet 11 in the axial direction. The eddy current occurs so that it cancels the variation of the magnetic field, namely suppresses the movement of the magnet 11. Thus, the eddy current attenuates the moving force of the magnet 11. When the frictional force that acts on the magnet 11 is too weak, the magnet 11 is continuously moved against the housing 5 upon rotation thereof. As a result, the magnet 11 may generate self-induced oscillation. With the attenuation member 76, the viscous damping coefficient (linear viscous damping coefficient) of the magnet 11 increases. As a result, the magnet 11 can be prevented from self-induced oscillation.

Figure 44:
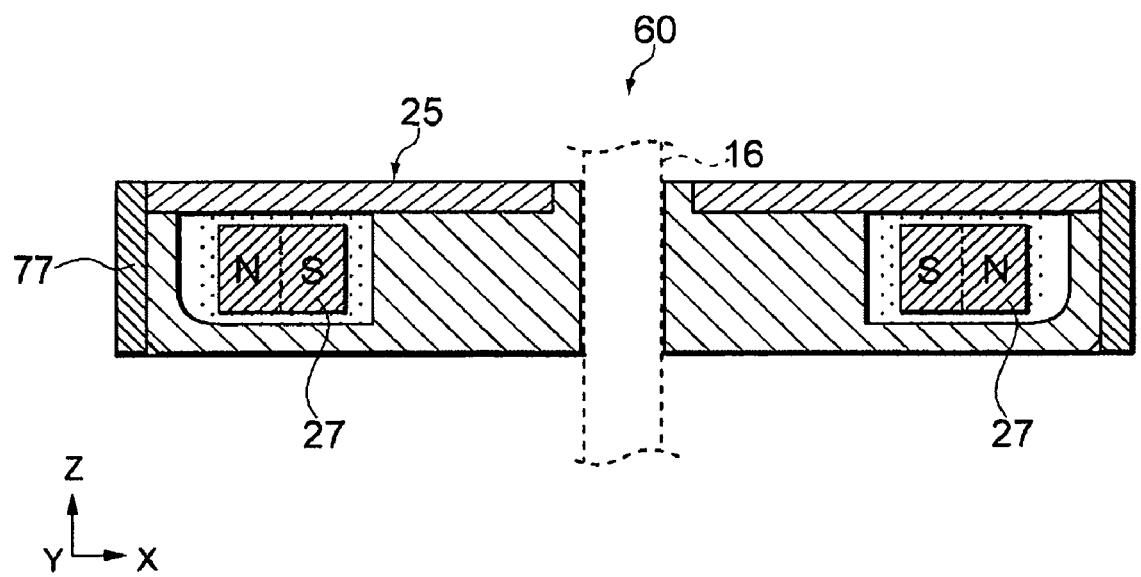
FIG. 44 is a sectional view showing an automatic balancing apparatus having an attenuation member according to another embodiment of the present invention.
Figure 45:
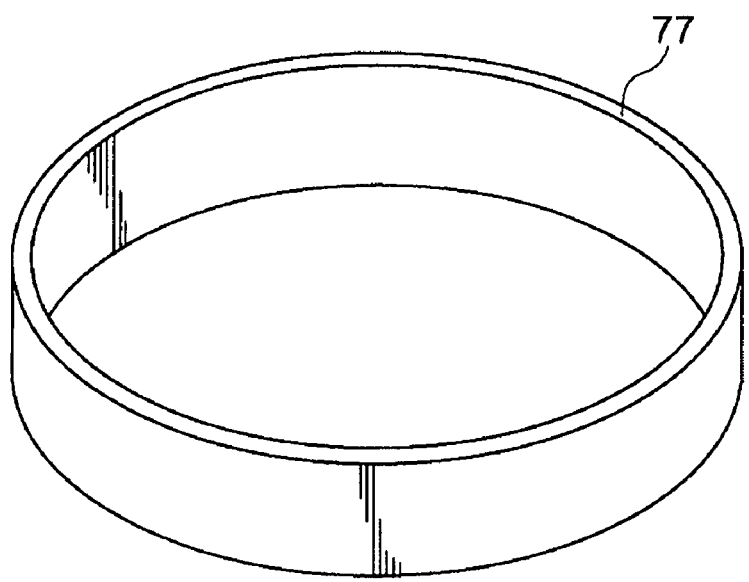
FIG. 45 is a perspective view showing the A attenuation member shown in FIG. 44.

FIG. 44 is a sectional view showing an automatic balancing apparatus having an attenuating member according to another embodiment of the present invention. FIG. 45 is a perspective view showing the attenuation member. The attenuating member 77 of the automatic balancing apparatus denoted by reference numeral 60 is formed for example in a ring shape. The attenuating member 77 is disposed on a side surface of the housing 25. In this case, to effectively generate an eddy current, the attenuating member 77 is aligned in the radial direction with a magnet 27 magnetized in the radial direction. This structure can achieve the same effect as the forgoing automatic balancing apparatus 90.

When the housing 5 or the case 2 is made of a non-magnetic substance for example aluminum, the housing 5 or the case 2 has the same function as the attenuation member 76 or 77. When the housing 5 has the function of the attenuating member, the automatic balancing apparatus can be downsized or slimmed.

Instead, an attenuating member made of a magnetic material may be used. In this case, when magnetic flux of the magnet 11 concentrates on the outer peripheral surface of the magnets 11 with the foregoing yoke, the attractive force of the magnet 11 and the attenuating member of the magnetic material decreases, and magnet 11 should be moved. In addition, an eddy current can be generated in the attenuating member.

Figure 46:
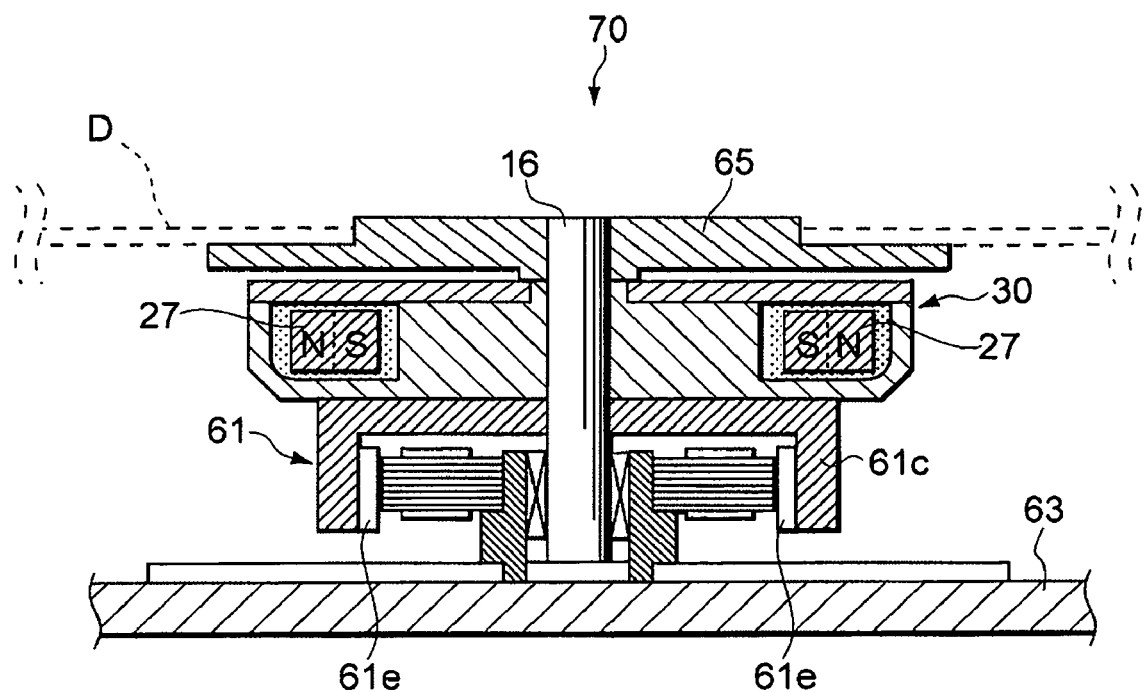
FIG. 46 is a sectional view showing a disc drive apparatus according to another embodiment of the present invention.
Figure 47:
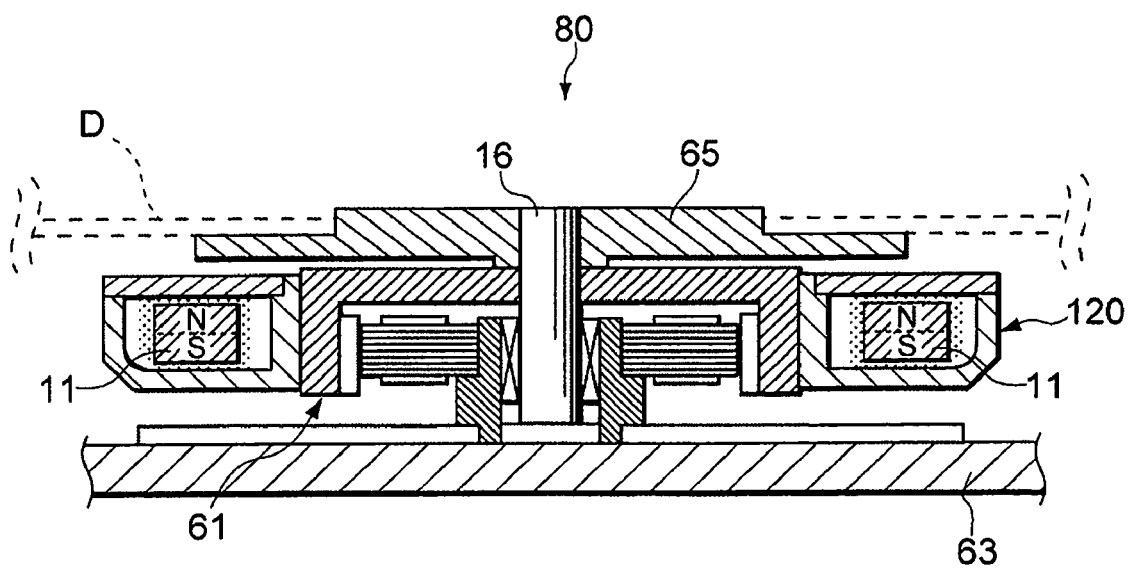
FIG. 47 is a sectional view showing a disc drive apparatus according to another embodiment of the present invention.

FIG. 46 and FIG. 47 are sectional views showing disc drive apparatuses according to another embodiment of the present invention. The disc drive apparatus 70 shown in FIG. 46 has the automatic balancing apparatus 30 shown in FIG. 13. When the automatic balancing apparatus 30 is aligned with the motor 61 in the axial direction, the magnet 27 of the automatic balancing apparatus 30 are magnetized in the radial direction. In other words, the magnetization direction is perpendicular to the axial direction. Thus, the influence of a leaked magnetic field of a magnetic circuit (a rotor 61c, a magnet 61e, and so forth) of the motor 61 against the magnet 27 can be suppressed.

In the disc drive apparatus 80 shown in FIG. 47, an automatic balancing apparatus 120 is mounted on the outer periphery side of the motor 61. In this case, the magnets 11 are magnetized in the direction of the rotational axis. In this structure, the influence of a leaked magnetic field of a magnetic circuit of the motor 61 against the magnet 11 can be suppressed.

According to the embodiments shown in FIG. 16 to FIG. 25, a mode of which a plurality of magnets disposed in one automatic balancing apparatus each have a yoke was described. However, a mode of which at least one of a plurality of magnet has a yoke might be considered.

As a device to which an automatic balancing apparatus according to each of the foregoing embodiments is mounted, a disc drive apparatus was exemplified. However, as long as a device has a motor with a rotating rotor, the device to which the disc drive apparatus is mounted is not limited to a disc drive apparatus.

Modes of which at least two of feature portions, for example an automatic balancing apparatus, a magnet, and a yoke, according to the foregoing embodiments are combined might be considered.

It should be understood by those skilled in the art that various modifications, combinations, sub-combinations and alternations may occur depending on design requirements and other factors insofar as they are within the scope of the appended claims or the equivalents thereof.

What is claimed is:

1. An automatic balancing apparatus, comprising:
   a plurality of magnets;
   magnetic fluid; and
   a rotatable housing which has a moving path disposed along a circumferential direction of rotation, the plurality of magnets being moved through the moving path, and which accommodates the individual magnets and the magnetic fluid,
   wherein the magnet has an outer peripheral magnet portion and an inner peripheral magnet portion,
   wherein the moving path has an outer peripheral moving path surface and an inner peripheral moving path surface, and
   wherein the outer peripheral magnet portion faces the outer peripheral moving path surface and the inner peripheral magnet portion faces the inner peripheral moving path surface.

2. The automatic balancing apparatus as set forth in claim 1,
   wherein each of the magnets is formed in an arc block shape along the peripheral direction.

3. The automatic balancing apparatus as set forth in claim 1,
   wherein each of the magnets is formed in a columnar shape.

4. The automatic balancing apparatus as set forth in claim 1,
   wherein the moving path allows each of the magnets to be moved while a posture of each of the magnets is maintained.

5. The automatic balancing apparatus as set forth in claim 4,
   wherein each of the magnets has a first width on a plane nearly perpendicular to a rotational axis of the rotation and in a direction perpendicular to a radial direction of the rotation, and
   wherein the moving path has a second width smaller than the first width in the radial direction.

6. The automatic balancing apparatus as set forth in claim 5,
   wherein each of the magnets is magnetized such that they repel each other along the moving path.

7. The automatic balancing apparatus as set forth in claim 6,
   wherein each of the magnets is magnetized with the same polarity on the same side in the direction of the rotational axis of the rotation.

8. The automatic balancing apparatus as set forth in claim 6,
   wherein each of the magnets is magnetized such that the same polarity faces each other in the peripheral direction.

9. The automatic balancing apparatus as set forth in claim 6,
wherein each of the magnets is magnetized such that their polarities are symmetrical with respect to the center of the rotation in the radial direction of the rotation.

10. The automatic balancing apparatus as set forth in claim 1,
wherein each of the magnets has a plurality of pairs of magnetic poles.

11. The automatic balancing apparatus as set forth in claim 10,
wherein each of the magnets has a plurality of pairs of magnetic poles in the peripheral direction of the rotation.

12. The automatic balancing apparatus as set forth in claim 1, further comprising:
a yoke mounted on the magnet.

13. The automatic balancing apparatus as set forth in claim 1, further comprising:
a resin member which coats the magnet.

14. The automatic balancing apparatus as set forth in claim 1,
wherein each of the magnets has an outer peripheral portion having a curved surface, and
wherein the moving path has an outer peripheral wall surface having a curved path surface.

15. The automatic balancing apparatus as set forth in claim 1,
wherein the moving path has an air path which extends from the inner periphery side of the rotation to the outer periphery side.

16. The automatic balancing apparatus as set forth in claim 1,
wherein the moving path has an outer peripheral wall surface on the outer periphery side of the rotation, and
wherein the magnetic fluid is supplied for an amount that allows centrifugal force of the rotation to cause the magnetic fluid to flow to the outer periphery side of the rotation and a film of the magnetic fluid to be formed on the entire periphery of the outer peripheral wall surface.

17. The automatic balancing apparatus as set forth in claim 1,
wherein the moving path has a sticking prevention section which prevents each of the magnets from sticking to a path surface of the moving path.

18. The automatic balancing apparatus as set forth in claim 17,
wherein the sticking prevention section is made of grooves or depressed and raised portions formed on the path surface of the moving path.

19. The automatic balancing apparatus as set forth in claim 17,
wherein the path surface of the moving path is formed with predetermined surface roughness.

20. The automatic balancing apparatus as set forth in claim 1, further comprising:
an attenuation member which attenuates moving force of each of the magnet.

21. The automatic balancing apparatus as set forth in claim 20,
wherein the attenuation member is a member which generates an eddy current as each of the magnets is moved.

22. The automatic balancing apparatus as set forth in claim 21,
wherein the attenuation member is made of a non-magnetic substance.

23. The automatic balancing apparatus as set forth in claim 1,
wherein the housing is a member which generates an eddy current as each of the magnets is moved.

24. An automatic balancing apparatus, comprising:
a plurality of magnets;
magnetic fluid;
a rotatable housing which has a moving path disposed along a circumferential direction of rotation, the plurality of magnets being moved through the moving path, and which accommodates the individual magnets and the magnetic fluid; and
a yoke mounted on the magnet,
wherein the yoke is formed such that magnetic flux of the magnet concentrates on the outer periphery side of the rotation.

25. The automatic balancing apparatus as set forth in claim 24,
wherein the magnet has an inner periphery surface facing the inner periphery side of the rotation, and
wherein the yoke covers the inner periphery surface.

26. The automatic balancing apparatus as set forth in claim 24,
wherein the magnet has an outer peripheral surface that faces the outer periphery side of the rotation, and
wherein the yoke covers the magnet such that the outer peripheral surface of the magnet is exposed.

27. The automatic balancing apparatus as set forth in claim 24,
wherein the yoke has a magnetic gap on the outer periphery side of the rotation.

28. An automatic balancing apparatus, comprising:
a plurality of magnets;
magnetic fluid; and
a rotatable housing which has a moving path disposed along a circumferential direction of rotation, the plurality of magnets being moved through the moving path, and which accommodates the individual magnets and the magnetic fluid,
wherein each of the magnets has a taper surface formed on the outer periphery side of the rotation, the width in the axial direction of the rotation gradually decreasing outwardly on the outer periphery side, and
wherein the moving path has a taper wall surface formed on the outer peripheral surface of the rotation, the width in the axial direction of the rotation gradually decreasing outwardly on the outer periphery side of the rotation.

29. A rotating apparatus, comprising:
a plurality of magnets;
magnetic fluid;
a housing which accommodates the plurality of magnets and the magnetic fluid and which has a moving path disposed along a circumferential direction of rotation, the plurality of magnets being moved through the moving path;
a drive mechanism which rotates the housing,
wherein the magnet has an outer peripheral magnet portion and an inner peripheral magnet portion,
wherein the moving path has an outer peripheral moving path surface and an inner peripheral moving path surface, and
wherein the outer peripheral magnet portion faces the outer peripheral moving path surface and the inner peripheral magnet portion faces the inner peripheral moving path surface.

30. A rotating apparatus, comprising:
a plurality of magnets;
magnetic fluid;
a housing which accommodates the plurality of magnets and the magnetic fluid; and
a drive mechanism which rotates the housing, wherein the drive mechanism is aligned with the housing in the axial direction of the rotation and generates a leaked magnetic field in the axial direction, and wherein the magnets are magnetized in the radial direction of the rotation.

31. A rotating apparatus, comprising:

a plurality of magnets;

magnetic fluid;

a housing which accommodates the plurality of magnets and the magnetic fluid; and a drive mechanism which rotates the housing, wherein the drive mechanism is aligned with the housing in the radial direction of the rotation and generates a leaked magnetic field in the radial direction, and wherein the magnets are magnetized in the radial direction.

32. A disc drive apparatus, comprising:

a holding section which holds a disc on which a signal is recordable;

a plurality of magnets;

magnetic fluid;

a housing which accommodates the plurality of magnets and the magnetic fluid and which has a moving path disposed along a circumferential direction of rotation, the plurality of magnets being moved through the moving path; and a drive mechanism which rotates the holding section and the housing together, wherein the magnet has an outer peripheral magnet portion and an inner peripheral magnet portion, wherein the moving path has an outer peripheral moving path surface and an inner peripheral moving path surface, and wherein the outer peripheral magnet portion faces the outer peripheral moving path surface and the inner peripheral magnet portion faces the inner peripheral moving path surface.

* * * * *